United States Patent
Pachon et al.

(10) Patent No.: US 9,378,471 B2
(45) Date of Patent: Jun. 28, 2016

(54) MULTIPLE USER RESOURCE SCHEDULING

(75) Inventors: Julian Pachon, Austin, TX (US); Marc Anderson, Austin, TX (US); David Staheli, Cedar Park, TX (US)

(73) Assignees: GE AVIATION SYSTEMS TALERIS LTD, Gloucestershire (GB); GE FLIGHT EFFICIENCY SERVICES, INC, Austin, TX (US)

( * ) Notice: Subject to any disclaimer, the term of this patent is extended or adjusted under 35 U.S.C. 154(b) by 1935 days.

(21) Appl. No.: 11/961,711

(22) Filed: Dec. 20, 2007

(65) Prior Publication Data
US 2008/0215408 A1 Sep. 4, 2008

Related U.S. Application Data

(60) Provisional application No. 60/892,405, filed on Mar. 1, 2007.

(51) Int. Cl.
*G06Q 10/06* (2012.01)

(52) U.S. Cl.
CPC .......... *G06Q 10/06* (2013.01); *G06Q 10/06312* (2013.01); *G06Q 10/063116* (2013.01)

(58) Field of Classification Search
None
See application file for complete search history.

(56) References Cited

U.S. PATENT DOCUMENTS

| | | | |
|---|---|---|---|
| 5,634,055 A | 5/1997 | Barnewall et al. | |
| 6,067,551 A * | 5/2000 | Brown et al. | |
| 6,253,147 B1 | 6/2001 | Greenstein | |
| 6,314,361 B1 * | 11/2001 | Yu et al. | 701/120 |
| 6,335,733 B1 * | 1/2002 | Keren et al. | 345/418 |
| 6,397,142 B1 | 5/2002 | Greenstein | |
| 6,408,276 B1 * | 6/2002 | Yu et al. | 705/7.16 |
| 6,879,997 B1 * | 4/2005 | Ketola et al. | 709/208 |
| 2002/0069001 A1 | 6/2002 | Sinex | |
| 2002/0091756 A1 | 7/2002 | Goodwin | |
| 2002/0133389 A1 | 9/2002 | Sinex | |
| 2003/0139961 A1 | 7/2003 | Arguello et al. | |
| 2003/0163334 A1 | 8/2003 | Pachon et al. | |
| 2003/0167110 A1 | 9/2003 | Smith et al. | |
| 2003/0225598 A1 | 12/2003 | Yu et al. | |
| 2005/0004828 A1 | 1/2005 | deSilva et al. | |
| 2005/0027579 A1 * | 2/2005 | Tiourine et al. | 705/8 |

(Continued)

FOREIGN PATENT DOCUMENTS

KR 20050010936 1/2005

OTHER PUBLICATIONS

Mathaisel, Dennis F.X., "Decision Support for Airline System Operations Control and Irregular Operations," Computer Operations Research, 1996, vol. 23, No. 11, pp. 1083-1098.

(Continued)

*Primary Examiner* — Anita Coupe
*Assistant Examiner* — Ashley Y Young
(74) *Attorney, Agent, or Firm* — GE Global Patent Operation; William S. Munnerlyn

(57) ABSTRACT

Generally, an airline operations computing system accomplishes rule checking in an efficient and useful manner and provides functionality that allows multiple different users to accomplish schedule changes in a manner that minimizes conflicts between different schedulers. In addition, an airline operations computing system includes a common rules engine that is used by multiple different optimizer and decision support systems of the airline operations computing system.

20 Claims, 26 Drawing Sheets

(56) References Cited

U.S. PATENT DOCUMENTS

2005/0125264 A1 6/2005 Bramnick et al.
2005/0209896 A1* 9/2005 Fauser et al. .................. 705/5

OTHER PUBLICATIONS

Authorized officer Beate Giffo-Schmitt, International Preliminary Report on Patentability in PCT/US2008/55218 mailed Sep. 11, 2009, 6 pages.
Authorized officer Beate Giffo-Schmitt, International Preliminary Report on Patentability in PCT/US2008/55224 mailed Sep. 11, 2009, 6 pages.
Authorized officer Philippe Becamel, International Preliminary Report on Patentability in PCT/US2008/55489 mailed Sep. 11, 2009, 6 pages.
Australian Patent Office, Office Action for Application No. 2008221285 mailed Nov. 11, 2011 (2 pages).
Falierou, Examiner in corresponding European application No. EP 08 73 909, European Office Action dated Dec. 28, 2011, 7 pages.
Falierou, Examiner in corresponding European application No. EP 08 73 914, European Office Action dated Dec. 28, 2011, 7 pages.
Falierou, Examiner in corresponding European application No. EP 08 73 1119, Extended European Search Report dated Dec. 28, 2011, 7 pages.
U.S. Non-Final Office Action for U.S. Appl. No. 11/961,579 dated Mar. 12, 2010 (25 pages).
U.S. Final Office Action for U.S. Appl. No. 11/961,579 dated Jul. 29, 2010 (21 pages).
U.S. Non-Final Office Action for U.S. Appl. No. 11/961,612 dated Feb. 4, 2011 (23 pages).
The Patent Office of the People's Republic of China, First Office Action for Application No. 200880012969.3 mailed Mar. 10, 2011, 9 pages.
The Patent Office of the People's Republic of China, First Office Action for Application No. 200880012916.1 mailed Feb. 24, 2011, 9 pages.
The Patent Office of the People's Republic of China, First Office Action for Application No. 200880012945.8 mailed Mar. 2, 2011, 9 pages.
Australian Patent Office, Office Action for Application No. 2008223211 mailed Sep. 5, 2011 (4 pages).
U.S. Final Office Action for U.S. Appl. No. 11/961,612 mailed Jul. 21, 2011 (17 pages).

* cited by examiner

US 9,378,471 B2

MULTIPLE USER RESOURCE SCHEDULING

CROSS REFERENCE TO RELATED APPLICATIONS

This application claims priority from U.S. Provisional Application Ser. No. 60/892,405, filed Mar. 1, 2007, the contents of which are incorporated herein by reference.

TECHNICAL FIELD

This document describes an airline operation computing system that includes a suite of software applications.

BACKGROUND

Sophisticated computing systems are needed to manage the operations of an airline. Airline operation computing systems exist that enable aircraft and crew planning, day-to-day operations management and reporting. In addition, airline operation computing systems exist that enable airlines to manage flight crews, equipment and passengers affected by service disruptions, such as weather or mechanical delays.

Typical airline operation systems are complex and are required to manage massive amounts of data. In addition, these systems are used in scenarios where the operations being managed can change very quickly, due to weather or mechanical delays. As such, the systems need to be easy to use, and allow decision making to be made very quickly.

Scheduling of airline operations is complicated by the number and complexity of the rules that must be considering in the scheduling. Systems exist that have rules engines and rules database that enable checking whether any rules have been violated for a scheduling change that has been made. In addition to the complex rules environment in which scheduling changes are made, further complexity arises from the fact that multiple different users may be interacting with the schedule and attempting to make schedule changes that impact other parts of an overall schedule.

SUMMARY

Generally, an airline operations computing system is provided that accomplishes rule checking in an efficient and useful manner and provides functionality that allows multiple different users to accomplish schedule changes in a manner that minimizes conflicts between different schedulers.

In one aspect, a method is provided for revising a schedule of resources for an airline or other similar carrier operation. The method includes receiving a set of one or more proposed changes to a schedule of resources for an airline operation. The method further includes, as each of the one or more proposed changes of the set are made, checking, checking, before revising the schedule based on the set of one or more proposed changes, with an electronic rules engine to determine if the proposed change would violate any of a plurality of predefined rules, and if any of the plurality of predefined rules is violated, providing a responsive display indicating that the change violates one or more of the predefined rules. The method further includes receiving user input committing the set of one or more proposed changes, and in response, updating the schedule of resources for the airline operation to include the set of one or more proposed changes.

In various implementations, the method may include one or more of the following features. The schedule of resources may include flight crew resources. The predefined rules may include rules provided by an airline regulatory organization, for example, the United States Federal Aviation Administration. The predefined rules may include rules regarding a minimum allowable period of time between an arrival time of a first flight at a particular location until a departure time of a second flight from the particular location. The rules engine may receive information regarding changes in flight schedules.

In addition or alternatively, after the responsive display indicating that the change violates one or more of the predefined rules, a proposed change of the set of one or more proposed changes may be received that proposes a change that causes the violated rule to no longer be violated. After the proposed change that causes the violated rule to no longer be violated is received, the responsive display indicating that the change violates one or more of the predefined rules may no longer displayed. Alternatively or additionally, a second responsive display may be provided that indicates the violated rule is no longer violated. The updating of the schedule of resources for the airline operation to include the set of one or more proposed changes may be made despite that one or more of the one or more proposed changes violates at least one of the plurality of predefined rules.

Computer program products are also provided to carry out the above described methods of revising a schedule of resources for an airline or other similar operation. Such computer program products are tangibly embodied in computer storage medium and comprise instructions that when executed by a processor cause operations to be performed that carry out the above-described methods to revise a schedule of resources for an airline operation. In addition, computing systems are provided that are programmed to carry out the above described method to revise a schedule of resources for an airline operation.

In another aspect, an airline operations computing system is provided that includes a common rules engine. More specifically, the airline operations computing system includes at least to of a planning optimizer and decision support system, a scheduling optimizer and decision support system, and a day-of-operations recovery optimizer and decision support system. The system further includes a common rules engine used with each of the at least two optimizer and decision support systems.

In various implementations, the airline operations computing system with a common rules engine may include one or more of the following features. The planning optimizer and decision support system may be or include a crew resource optimizer. The planning optimizer and decision support system may be or include a flight schedule optimizer. The scheduling optimizer and decision support system may be or include a crew pairing and crew roster optimizer. The scheduling optimizer and decision support system may be or include an aircraft routing optimizer. The scheduling optimizer and decision support system comprises may be or include an optimizer for receiving crew bids for certain flights. The day of operations optimizer and decision support system may be or include an aircraft recovery optimizer, a crew recovery optimizer, and/or a passenger recovery optimizer.

In yet another aspect, there is provided a method used in accomplishing revisions to a schedule of resources for an airline operation in a system in which multiple different users are permitted to access and make changes to the schedule of resources. The method includes receiving, from a first user employing a first user computing device, a proposed change to a schedule of resources for an airline operation, the proposed change impacting one or more flight-resource pairings of the schedule of resources. The method also includes, before the proposed change is committed and an update to the schedule of resources is made to include the proposed change, providing, on a second user computing device being employed by a second user, a graphical display of at least a portion of the schedule of resources that includes at least one of the one or more flight-resource pairings impacted by the proposed change of the first user, the graphical display providing a visual indication identifying the one or more flight-resource pairings impacted by the proposed change of the first user.

In various implementations, the method may include one or more of the following features. Each flight-resource pairing of the schedule of resources may include one or more flights in a series of flights and an associated crew member. The second user, during a time in which the proposed change of the first user is pending, may not be locked from proposing a second change that impacts the one or more flight-resource pairings impacted by the proposed change of the first user.

The multi-user method may further include receiving, from the second user employing the second user computing device and during the time in which the proposed change of the first user is pending, the second proposed change that impacts the one or more flight-resource pairings impacted by the proposed change of the first user. In such a case, the method may further include receiving user input committing the proposed change, and in response, updating the schedule of resources for the airline operation to include the proposed change.

In addition, at least one of the one or more flight-resource pairings may not have an assigned resource. In this case, the proposed change may have proposed an assignment of a resource to the flight-resource pairing that does not yet having a resource assignment. Additionally or alternatively, all of the one or more flight-resource pairings may have an assigned resource and the proposed change may propose a change to one of the one or more flight-resource pairings.

Computer program products are also provided to carry out the above described multi-user scheduling methods. Such computer program products are tangibly embodied in computer storage medium and comprise instructions that when executed by a processor cause operations to be performed that carry out the above-described methods used in accomplishing revisions to a schedule of resources for an airline operation in a system in which multiple different users are permitted to access and make changes to the schedule of resources. In addition, computing systems are provided that are programmed to carry out the above described multi-user methods.

Further features and advantages may be understood with reference to the figures and the following description.

DESCRIPTION OF DRAWINGS

The same numbers in different figures indicate the same structures or processes.

DETAILED DESCRIPTION

Figure 1A:
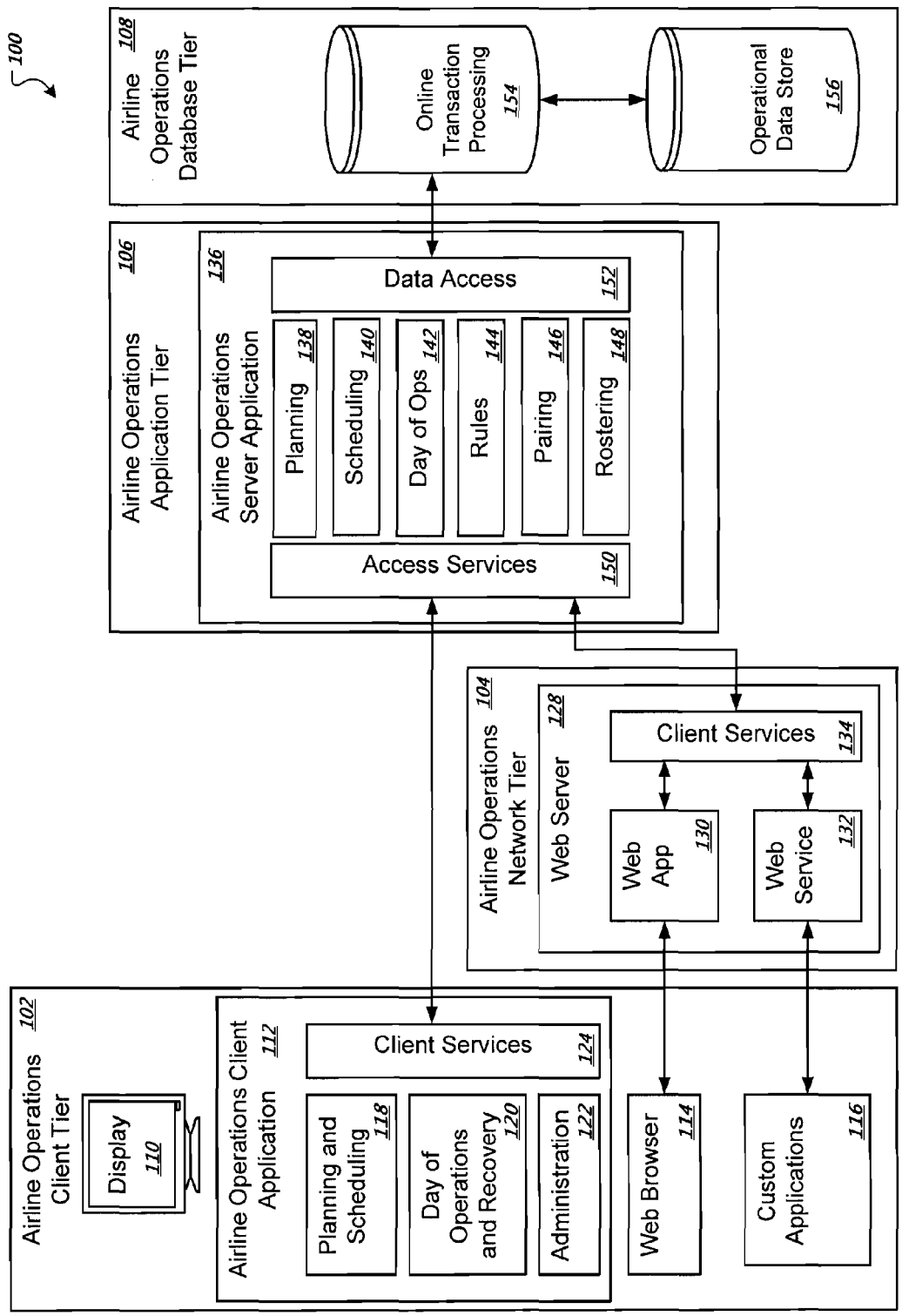
FIG. 1A is a block diagram of one implementation of an airlines operation computing system, showing the various modules of application software programs that make up a suite.

FIG. 1A is a block diagram of an implementation of an airline operations computing system 100, showing the various modules of application software programs that make up a suite. In general, the airline operations computing system 100 performs functions related to all aspects of an airline's operations functionality. This includes, planning, scheduling, and day-of-operations functions.

In the FIG. 1A example, the system 100 includes an airline operations client tier 102, an airline operations network tier 104, an airline operations application tier 106, and an airline operations database tier 108. In general, the airline operations client tier 102 performs functions that provide an interface through which a user may interact with the system 100. One such client tier 102 is shown in FIG. 1A for illustration purposes; typically there will be several such similarly functioning clients in a system in various different locations.

The airline operations client tier 102 includes a display device 110, an airline operations client application 112, a web browser 114, and a set of custom applications 116. The display device 110 may be the monitor of a computer, the screen of a portable device, the display of a mobile device, or other visual output device, by way of a few examples. The display device 110 provides a visual output for the airline operations client application 112, the web browser 113, and the set of custom applications 116.

The airline operations client application 112 includes number of software modules. In the FIG. 1 example, the modules are a planning and scheduling module 118, a day of operations and recovery module 120, an administration module 122, and a client services module 124. The planning and scheduling module 118 provides user interface functions for viewing and editing airline resource schedules, such as the schedules and assignments between scheduled flights, airplanes, and flight crews. This module 118 includes, for example, crew planning functions that comprise long-term staffing of flight crews, crew scheduling functions that comprise the production of pairing (discussed below) and flight crew rosters. For example, the planning and scheduling module 118 may display screens that allow the user to associate an airliner with a planned flight or series of flights, associate a crew with a flight or series of flights, and perform other tasks related to the planning and scheduling of flights and airline resources.

The planning and scheduling module 118 presents a user interface that may be used to display flight pairings, and to fill or make changes to such pairings. A pairing refers to a data structure for a specified flight or series of flights, in which data structure a resource such as a crewmember may be associated with the flight or series of flights. If a resource has not been assigned to the specified flight or series of flights, the pairing for that flight or series of flights may be referred to as an open pairing. The term pairing may also, depending on the context, refer to the actual association between a resource and the flight or series of flights, as in there is a pairing of a particular resource and a particular flight or series of flights. Also, a single flight or a series of multiple flights may be grouped together and referred to as a duty. Such a grouping may be created because it may have been deemed desirable to have a single resource assigned for the duty. In such a case, there may be a pairing for the grouped series of flights that constitute a duty.

The planning and scheduling module 118 presents a user interface that may be used to fill an open pairing by assigning a resource such as a flight crew member to it, and also to change a resource assignment for a pairing. This association between a resource and a specified flight or series of flight may be performed using a drag-and-drop operation. For example, the user may drag-and-drop a visual representation of a particular flight crewmember onto a visual representation of a scheduled flight or series of flights constituting a duty, or vice-versa, to associate the crewmember with the scheduled flight or series of flights. The same may be done, in some implementations, to associate other types of resources, such as a particular aircraft, with the flight or series of flights. In addition, there may be different groupings of flights for purposes of crew resources, as opposed to aircraft resources for example. In another example, the user may drag-and-drop a visual representation of a flight crewmember to a scheduled flight, or vice-versa, thereby associating the crewmember with the scheduled flight.

The planning and scheduling module 118 also may provide a visual indication that a pairing is being edited. For example, when a first user has selected and is operating an instance of the module 118 to edit a particular pairing (e.g., changing the pilot that is assigned to the pairing), the pairing may appear highlighted on the display device 110 to indicate that the pairing contains proposed changes that have not yet been committed so as to effect the proposed changes to the actual schedule. This may be useful, for example, if the user's attention is drawn away from the display device, and the user wants to be able to quickly determine the pairing for which the user was performing a scheduling action. In addition, another user using a different display device may be viewing the same pairing from another instance of the module 118, and in this case the pairing may be visually highlighted to indicate that the pairing is being edited by another user. This may be particularly useful in a scenario where there are multiple or even numerous schedulers, and a user may want to know whether or not someone else is performing a scheduling operation that would affect a pairing that the user is viewing.

The planning and scheduling module 118 may further provide a visual indication that a pairing assignment or a proposed change to a pairing assignment violates a predefined rule stored in a rules database. For example, a pilot may be assigned to a flight that will cause the pilot to exceed the number of hours a pilot may fly between rest periods. The planning and scheduling module 118 may cause an indicator to be displayed in association with the pairing, flight, or resource to indicate that the pairing violates one or more rules. Examples of rules may be guidelines based upon airline policy, union rules, airline regulatory organization (e.g., United States Federal Aviation Administration, FAA) rules, and other sources of rules and policies that may effect how flight resources are scheduled.

In some embodiments, a single indicator may be provided on a display to indicate the existence of one or more rule violations, be it one rule violation or multiple rule violations. In other embodiments, multiple indicators may be provided with each indicator indicating a different rule violation. In addition or alternatively, there may be multiple different appearance types for rule warnings, which appearance would indicate the nature or type of rule violation. For example, a pairing that may cause a non-critical rule warning (e.g., an overly large airplane being assigned to flight with few passengers) may be displayed with a "non-critical" warning icon. In another example, a pairing that may cause a pilot to break a law or flight regulation (e.g., flying too many hours without a rest period) may be displayed with a "critical" warning icon.

In some embodiments, multiple warning indicators may be used until a rule warning indicator limit is reached. For example, the planning and scheduling module 118 may display up to four individual indicators to indicate up to four rule violation warnings, but five or more rule warnings may be represented by another style of warning indicator. In the current example, five or more warnings may be indicated by a single icon that indicates the actual number of warnings, by four icons and an ellipsis, or by some other visual means to indicate multiple rule warnings.

The system 100 has an architecture, design and software functionality that enables the checking of proposed schedule changes to occur substantially in real-time. For example, the system 100 enables a user to edit a pairing and submit the proposed changes (but not commit them), and the system 100 will then check the edited pairing for rule violations before the changes are committed to the database. If the system 100 determines that the proposed pairing changes violate any of the rules, then the system 100 may indicate to the user any rule violation warnings that may have been generated, as described previously. The user may then choose to resolve any violations that may exist by making further changes (which also may be checked for rule violations in substantial real time), or leave the violations unresolved. The system 100 may, for example, provide rule violations relatively instantaneously on a display screen as a user is working on a pairing. After the user is satisfied with the schedule changes, the user may provide an input that commits the schedule changes. This may be done despite that there are rule violations, or in some cases, the user may have made further changes that resolved any intermediate changes that created one or more rule violations.

The day of operations and recovery module 120 provides general functionality for the day of operations management, as well as functionality for handling any daily disruptions. For example, the day of operations and recovery module 120 may provide functions that help the user reassign flight crews if a crewmember is unexpectedly absent from work, or if there are weather problems that disrupt flight operations. In another example, if an aircraft that is scheduled to a flight is grounded (e.g., needs unexpected repairs), then the module 120 may provide functions that help the user reassign aircraft to the scheduled flights.

The administration module 122 provides functionality for a user to edit airline resource information, security settings, rules parameters, or other administrative tasks. For example, an airline regulation that prohibits pilots from flying more than twelve hours without a rest period may be changed to a maximum of ten hours, and the administration module may allow the user to edit the rule parameter for maximum flight time to reflect the updated regulation.

The client services module 124 provides an applications programming interface (API) that handles one or more types of communications between the airline operations client tier 102 and the airline operations application tier 106. For example, the client services module 124 may encapsulate transmission control protocol/internet protocol (TCP/IP) messages, package user datagram protocol (UDP) datagrams, wrap web services messages, or manage other communications formats and protocols.

The web browser 114 is an application that provides a user with a means for interacting with hypertext markup language (HTML) pages and web applications. Examples of the web browser 114 may include Internet Explorer, available from Microsoft Corporation, Netscape Navigator, available from Netscape Communications and Weblogs, Inc., Firefox, available from Mozilla Corporation, and Opera Web Browser, available from Opera Software ASA.

The set of custom applications 116 may perform may provide a variety of different functions that are specific or unique to a particular airline. In many cases, there are standard software functions that apply generally to any airline and that will be delivered by a software vendor to an airline, and in addition, there may be additional custom applications that are either unique to a particular airline and/or provided by another vendor.

The airline operations network tier 104 in the FIG. 1A example includes a web server 128 to provide web service functionality in addition to or in lieu of direct access to the airline operations tier 106 provided by the client services module 124 provided in the client tier 102. The web server 128 includes a web application module 130, a web service module 132, and a client services module 134. The web application module 130 provides functions that allow a user to perform one or more functions of the airline operations client application 112 through the web browser 114.

In some embodiments, the client services module 134 of the web server 128 may be substantially the same as the client services module 124 of the airline operations client application 112. In some implementations, the web server client services module 134 may provide an API that may be used by the web application module 130 and the web service module 132 to communicate with the airline operations application tier 106.

The web service module 132 provides functions of a protocol bridge between the custom applications 116 and the airline operations application tier 106. For example, the web service module 132 may use Service Oriented Architecture Protocol (SOAP) messages use of an Internet application layer protocol as a transport protocol to communicate with the custom applications 116 over a network (e.g., the Internet).

In some implementations, the web service module 132 may receive SOAP messages from the custom applications 116, parse the SOAP messages, and use the client services module 134 to act as a bridge between the custom applications 116 and the airline operations application tier 106. In some implementations, the web service module 132 may translate data from the airline operations application tier 106 and the client services module 134, wrap the data as a SOAP message, and send the SOAP message to the custom applications 116. For example, the client services 116 may use an Internet connection and the web service module 132 to request and retrieve various types of airline operations data from the airline operations application tier 106.

The airline operations application tier 106 includes an airline operation server application 136. The airline operation server application 136 includes various modules that perform functions for the planning and scheduling of airline flight resources. Some of these modules include a planning module 138 (for long-term staffing of flight crews), a scheduling module 140 (for the production of pairings and rosters), day-of-operations module 142 (for day of operations management and recovery functions), a rules module 144, a pairing module 146, and a rostering module 148.

The airline operations sever application 136 also includes an access services module 150 and a data access module 152 to facilitate communication with the airline operations client application 112 (either directly or via the web server 128) and with the airline operations database tier 108. The access services module 150 communicates with the client services modules 124 and 134 of, respectively, the client application 112 and the web server 128. In some implementations, the access services module 150 may coordinate communications between the client services modules 124 and 134, and the server application modules 138-148. For example, an airline operations client application 112 may request that the airline operation server application 136 make a change to a flight resource. The access services module 150 may receive this request and respond by invoking functions of the scheduling module 140 and the rules module 144 to update a schedule and check for any rules violations that the change may cause.

The application tier's data access module 152 provides an API to handle tasks associated with database communications. In some implementations, the server application modules 138-148 may use the data access module 152 to create, update, and delete data contained in the airline operations database tier 108. For example, the data access module 152 may handle the tasks of opening and closing database connections, transaction processing, caching, and other tasks generally associated with database communications.

The planning module 138 provides functions that allow users to perform various tasks related to crew resource planning, for example, long-term staffing functions. For example, the module may allow users to plan for flight and reserve requirements, absence requests, training requirements, and other tasks that deal with airline resource planning. In some implementations, the planning module 138 may provide decision support and forecasting functions. For example, the module 138 may help users create efficient resource plans by compiling information to anticipate and correct resource surpluses and shortfalls.

The scheduling module 140 provides functions for airline scheduling tasks Airline scheduling may include, for example, the production of pairings and rosters, and the scheduling module 140 may build the pairings and build the rosters.

The day of operations module 142 provides functionality to manage generally the day of operations, which may include functionality for users to handle daily disruptions. For example, the module 142 may help users reassign flight crews if a crewmember is unexpectedly absent from work, or if there are weather problems that disrupt flight operations. In another example, if an aircraft that is scheduled to a flight is grounded (e.g., needs unexpected repairs), then the module 142 may provide functions that help the user reassign aircraft to the scheduled flights.

The rules module 144 performs functions that determine whether various airline operational rules have been violated. Examples of these rules-checking functions may include determining if a schedule will cause a pilot to fly more hours than is allowed by law or by policy, determining if a flight crew member assigned to a flight is qualified to work on the type of airplane that is assigned to the flight, determining if a proposed schedule provides insufficient time between flights for a flight crew member to move between airplanes, determining whether a schedule will cause an airplane to exceed a limit on the number of flight hours between maintenance operations, or other various rules and policies that may affect flights and flight resources. For example, if a pairing causes an aircraft to fly in excess of an allowable number of hours between service checks, the module 144 may detect this rule violation.

The pairing module 146 provides functionality for users to edit pairings. For example, a pairing is a sequence of flight legs in which crewmembers are paired with flights that start at a crew base or originating airport, and end at the same crew base. The pairing module 146 provides functions for users to add, remove, change, or perform other functions that associate flight resources with pairings.

The rostering module 148 provides functions that generate and manage crew rosters. For example, the rostering module 148 may help users determine work schedules according to various fairness criteria, such as by crew preferences, by seniority, or by other factors that may be used to generate crew rosters. In some implementations, rostering functionality may be included in the scheduling module 140.

The airline operations database tier 108, in the FIG. 1A example, includes an online transaction processing (OLTP) database 154 and an operational data store (ODS) database 156. The OLTP database 154 may include one or more tables of data used for airline operations. For example, the airline operations data may include flight crew data, flight schedule data, flight schedule proposals, rules parameters, rules warnings, and other data that may be used for airline operations. In some implementations, the OLTP database 154 may be a data warehouse that is used by the airline operation server application 136. For example, the OLTP database 154 may be accessed by the data access module 152 to provide database functions to the modules 138-148 of the airline operation server application 136.

In some implementations, the data in the OLTP database 154 may be partly or wholly copied to the ODS database 156. For example, data in the OLTP database 154 may be replicated or mirrored to the ODS database 156. The ODS database 156 may integrate data from multiple sources (e.g., one or more tables within one or more databases) to facilitate operations, analysis, and reporting. For example, the ODS database 156 may be configured for online analytical processing (OLAP). In some implementations, the ODS database 156 may be structured and configured differently than the OLTP database 154. For example, database tunings and structures for OLTP operations may not work well for OLAP operations, and by using separate databases for OLTP and OLAP operations, the OLTP database 154 may be structured and tuned as needed for OLTP operations and the ODS database 156 may be structured and tuned to OLAP operations.

Figure 1B:
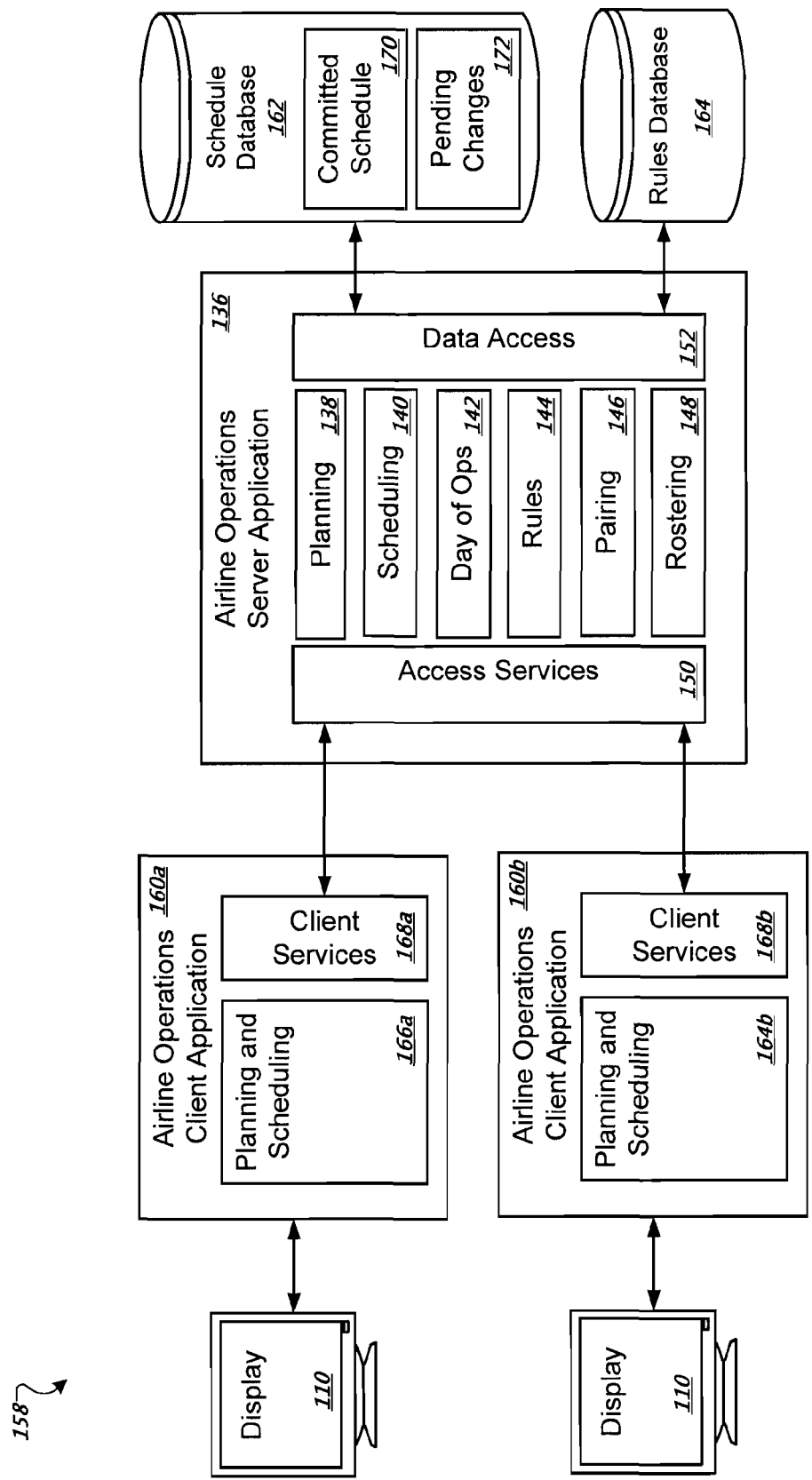
FIG. 1B is a block diagram of one implementation of an airlines operation computing system, showing the various modules of application software programs that make up a suite with multiple clients.

FIG. 1B is a block diagram of one implementation of an airline operations computing system 158 that is similar to the system 100 shown in FIG. 1A but showing different aspects of the system. FIG. 1B shows various modules of application software programs that make up a suite, and also shows multiple clients. The example system 158 includes multiple airline operations client applications, there being two such applications 160a and 160b shown in FIG. 1B for clarity, although in typical scenarios there are many more. The FIG. 1B system 158 also has an airline operations server application 136, a schedule database 162, and a rules database 164.

The airline operations client applications 160a and 160b each perform functions for their respective users to do airline resource planning and scheduling, for example. In some embodiments, the airline operations client applications 160a and 160b may each be implementations of the airline operations client application 112 of FIG. 1A, and thus the applications 160a and 160b provide the same functionality. The airline operations client applications 160a and 160b show their outputs on respective display devices 110.

The airline operations client applications 160a and 160b each includes a planning and scheduling module 166a and 166b, and a client services module 168a and 168b. In some embodiments, the planning and scheduling modules 166a and 166b may be the planning and scheduling module 118 of FIG. 1A. For example, the planning and scheduling modules 166a and 166b may display screens that allow the user to associate an aircraft with a planned flight or series of flights, associate a crew with a flight or series of flights, and perform other tasks related to the planning and scheduling of flights and airline resources.

The client services modules 168a and 168b each provides an applications programming interface (API) that handles one or more types of communications between the airline operations client applications 160a and 160b and the airline operations server application 136. In some embodiments, the client services modules 168a and 168b may be the client services module 124 shown in FIG. 1A.

The schedule database 162 may include tables of airline operations data. The schedule database 162, in the FIG. 1B example, includes a committed schedule table 170 and a pending changed table 172. The committed schedule table 170 may include data that describes airline flight resource schedules. The pending changes table 172 may include data that describes proposed changes to airline flight resource schedule data included in table 170. For example, a user may request to view a schedule, and the airline server application 136 may query the committed schedule table 170 for schedule data. The user may propose to make changes to the schedule data, and those proposed changes may be stored in the pending changes table 172 without data in table 170. If the proposed changes are approved, the airline operations server application 136 may cause one or more of the proposed schedules to be applied to the schedule data in the committed schedule table 170 and removed from the table 172.

The rules database 164 includes airline operations rules. For example, the rules module 144 may include a rule that checks to determine if a pilot has flown more than "N" hours in an "M" hour period. The values for "N" and "M" may be stored in the rules database and queried by the rules module 144 to define the number of hours a pilot may fly in a certain period.

In some embodiments, the rules module 144 may perform functions for a user to edit rule parameters in the rules database 164. For example, the rules database may include parameters that reflect an airline policy, such as a ratio of flight hours to training hours. The rules database may store a value of "1000" to define this ratio, but this ratio may need to be changed (e.g., airline policy change, pilot union contract change, FAA regulations change) to a value of "900." The rules module 144 may provide functions for a user to update the ratio or other rule parameters stored in the rules database 164.

In various implementations, airline schedules may be planned to comply with various rules. These rules may implemented to reflect various laws, regulations, policies, and other such guidelines that may be put forth by governments, regulatory agencies (e.g., the Federal Aviation Administration, FAA), unions, corporations, or other entities. Rules may be implemented in computer code, such as in the code of the rules module 144. In some implementations, rules may contain parameters (e.g., variables) that may permit quantitative or other types of parameters that may be stored elsewhere (e.g., the rules database 164). The rules engine 144 may obtain the specific values of rule parameters by loading the rule parameters from storage. By storing the specific values of rule parameters separately from the computer code that defines the rules, the rules may be adjusted without requiring edits to the computer code of the rules engine 144. In some implementations, rules may be edited by using a computer implemented method and user interface.

As will be described in more detail later, a process or method is provided by which rule checking is performed in a very immediate or "real-time" manner, such that a user who is in the process of making edits to a schedule is provided nearly instantaneous feedback on a display device if a proposed change violates any of many rules that may need to be followed with the schedule. Such a rule-checking and display process may be performed even before the proposed changes are actually "committed" to the schedule, or in other words, before the scheduling user enters into the system that a set of proposed changes will be made to the schedule. Such a rule-checking and display method is particularly useful in the context of an airline operations system in which there may be many rules that apply to scheduling. Some of those rules will be mandatory, and thus must be followed, whereas others may be guidelines or preferences that may be ignored in some cases. Before turning to the rule checking process, there will first be a discussion of the rules database, and how the rules database and parameters for the rules may be updated or edited.

Figure 2:
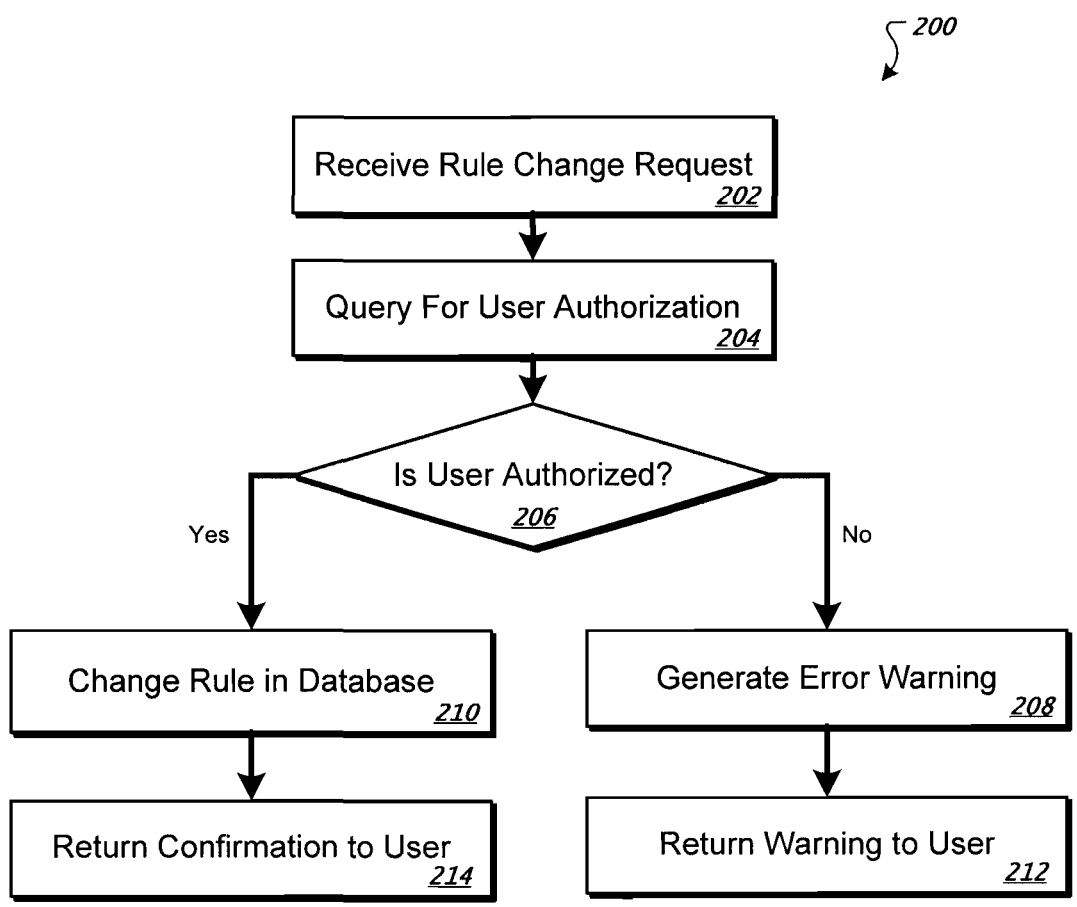
FIG. 2 is a flow diagram of an exemplary process for editing airline operations rule parameters.

FIG. 2 is a flow diagram of an exemplary computer implemented method 200 for editing airline operations rule parameters. In general, a user edits a rule parameter using a client application (e.g., the airline operations client application 112 of FIG. 1A or 160*a* and 160*b* of FIG. 1B), rule logic is handled by a rules engine (e.g., the rules module 144 shown in FIGS. 1A and 1B), and rule parameters are stored in a rules database (e.g., the rules database 164 of FIG. 1B).

The example method 200 of editing rule parameters begins when a rule parameter change request is received at step 202. In some embodiments, the rule change request may include information that identifies the rule parameter to be changed, the requested new parameter value, and the identity of the user who is making the request. Next, at step 204, a query for the user's authorization is made. For example, the user's identity information may be used to query a security database to determine, at step 206, if the user has sufficient privileges to make changes to rule parameters.

If at step 206, it has been determined that the user is not authorized to make changes to the rule parameters, then the method 200 continues at step 208. At step 208, an error warning is generated. In some embodiments, the error warning may inform the client application or the user that the user does not have the authorization needed to make changes to the rule parameters. At step 212, the error warning is returned to the user.

If, on the other hand, the user at step 206 is determined to be authorized to make changes to the rule parameters, then the process continues at step 210. At step 210, the requested rule parameter is changed in the rules database, and a parameter change confirmation is returned to the user at step 214. As such, not only is it possible to have rules that are stored in the system, but the rules may have various parameters that may easily be updated and revised as the need arises.

As mentioned previously, it is possible to use the previously described systems to perform various scheduling operations, such as assigning a particular resource to a flight or series of flights. Such operations may cause the systems to process the schedules and assignments through a collection of rules to determine if the schedules and assignments violate any of those rules. In some implementations, users may not know in advance which resources may cause rule violations when the resources are assigned to various pairings. For example, a pilot may have enough flying hours available to fulfill some pairing but not others. The previously described systems may provide functions that may allow users to propose schedule changes and see any potential rule violations that a particular assignment may cause before committing the changes. In this manner, the user may be allowed to experiment with various scheduling combinations before updating the active schedule.

In some embodiments, the previously described systems may allow multiple users to edit schedules at substantially the same time. Furthermore, the systems may also include functions that provide user with indications of other users' activities that are currently in process. For example, users who are viewing a schedule may see an indication that another user is currently proposing changes to a pairing. In this way, users may be advised that the pairing may be subject to change.

Figure 3:
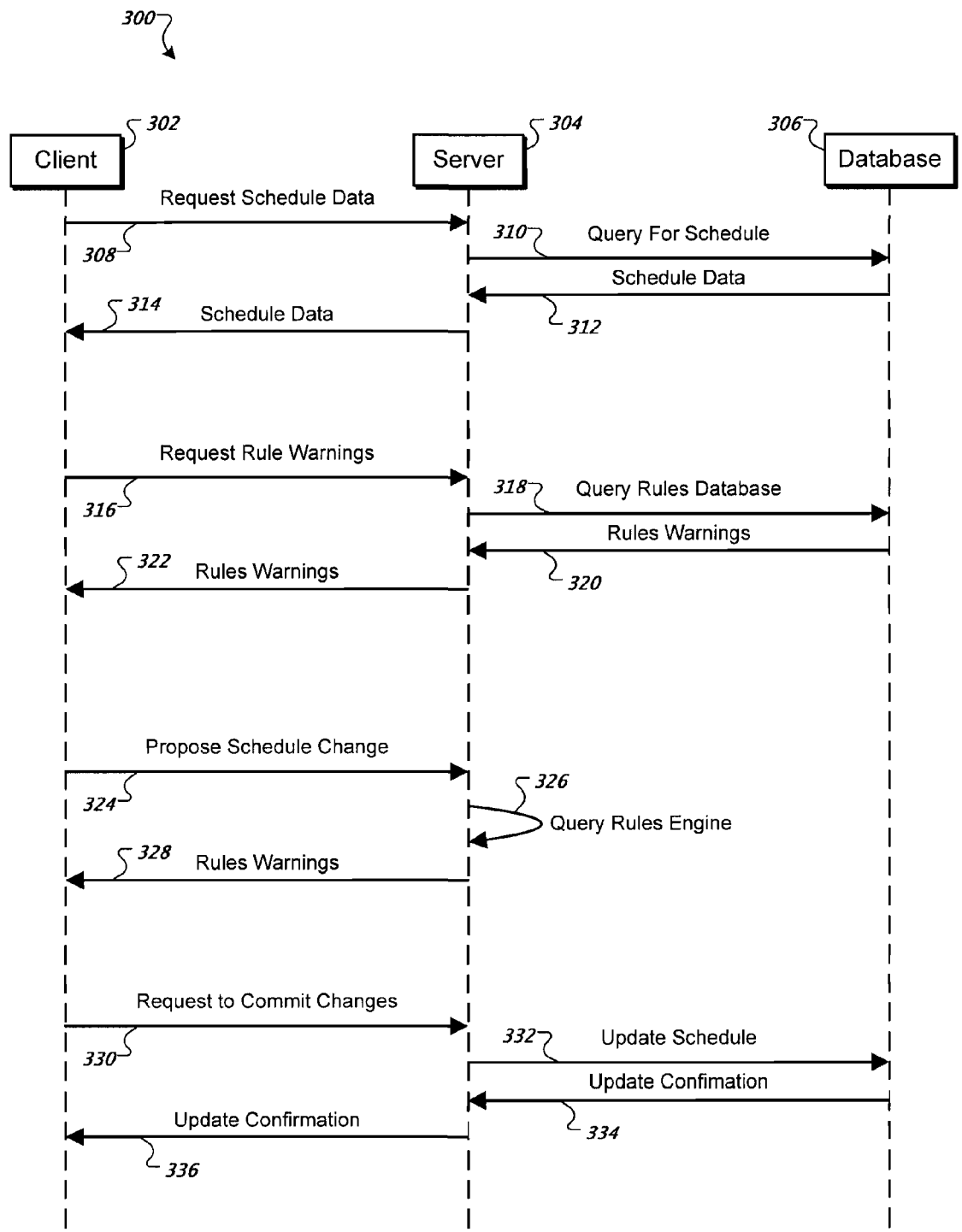
FIG. 3 is a flow diagram of an exemplary process for editing an airline operations schedule.

FIG. 3 is a flow diagram of an example computer-implemented method 300 for scheduling a resource for an airline flight or series of flights. In this example, the method 300 includes processes that are performed by a client application 302, a server application 304, and a database 306. Generally, the method 300 includes operations to associate, using a graphical user interface (GUI), a displayed representation of the resource with a displayed representation of the flight or series of flights. Examples of resources that may be scheduled in this manner include personnel or crew resources, aircraft resources, etc. In addition to the scheduling of resources for an airline operation, the techniques and methods described in this document may apply to other types of carrier operations, such as railway, for example, passenger services on a railway, bus operations, etc. In some embodiments, the client application 302 may be the airline operations client application 112 of FIG. 1A, the server application 304 may be the airline operations server application 134, and the database 306 may be the online transaction processing database 152.

The method 300 begins with step 308 wherein the client application 302 generates a request for schedule information or data to be retrieved from a database where that information is stored. For example, the user may wish to view all the pairings that originate from a selected airport on a selected date. The server application 304 receives the request and sends a query for schedule data to the database 306 at step 310. At step 312, the database 306 responds by sending the requested schedule data to the server application 304. The schedule data may include, for example, information about various flights and series of flights, and resource assignments for those flights and series of flights, if any.

Next, the server application 304 sends the schedule data to the client application 302 at step 314. In some embodiments, the server application may sort, filter, cache, transform, or perform other operations on data received from the database 306 before sending the schedule data to the client application 304.

At step 316, a request for rule warnings is sent to the server application 304. The server application 304 receives the request and responds by sending a query to the database 306 at step 318. At step 320 the database 306 responds by sending a set of rules warnings. At step 322, the server application 304 sends the requested rules warnings to the client application 302. The rules warnings may include, for example, information that describes various ways in which elements of a flight schedule may violate airline scheduling rules (e.g., airline policies, regulatory agency rules, union rules). Steps 316 through 322 represent preexisting rules violations that exist before the present user has made any changes to the schedule.

Next, the client application 302 sends a proposed schedule change to the server application 304 at step 324. At step 326, the server application 304 uses the proposed schedule change to query a rules engine, such as the rules module or engine 144 of FIG. 1A. For example, the user may use the client application 302 to propose changes to a pairing, and the server application 304 may process the proposed changes through the rules engine 144. The user may propose changes and cause a check for any rules violations that the proposed changes may cause or resolve, without committing the changes to the schedule database. At step 328, the server application 304 sends the requested rules violation warnings generated by the proposed schedule changes to the client application 302. The steps 324 through 328 may occur several times depending on the number of changes that a user makes to the schedule. In some cases, a change may be proposed to address a prior proposed change that led to a rule violation and thus a rule violation warning being generated.

Next, at step 330, the client application 302 sends a request to commit changes to the airline schedule. This may be done even if a rules violation is present. At the point in time in which the changes are being committed, in some implementations although not shown on FIG. 3, the rules engine may be re-run to make another check as to whether any rules have been violated, using step similar to those shown in steps 324 through 328, and any rules violation warning may be displayed again, perhaps in another screen or format. The server application 304 receives the request sent in step 330, and at step 332 sends a request to the database 306 to update the schedule. The database 306 responds at step 334 by confirming the requested update operation. At step 336, the server application 304 sends a confirmation to the client application 302 to confirm that the requested changes have been committed.

As mentioned previously, it is possible to use the previously described systems to perform various scheduling operations, such as assigning a particular resource to a flight or series of flights. Such an assignment may be performed during a scheduling operation to fill an open pairing with a particular crew resource, or to change the assignment for an already-filled pairing. Such assignments and reassignments may be accomplished easily and intuitively using a graphical user interface that identifies various flights or groupings of flights, and that also identifies various resources that can be assigned to the flights. Various techniques may be used to associate a flight or series of flights with a resource, such as a drag-and-drop operation using a pointer device such as a mouse. In addition, such associations may be performed by using mouse click or other input device operations in which two different displayed things can be associated with one another.

Figure 4A:
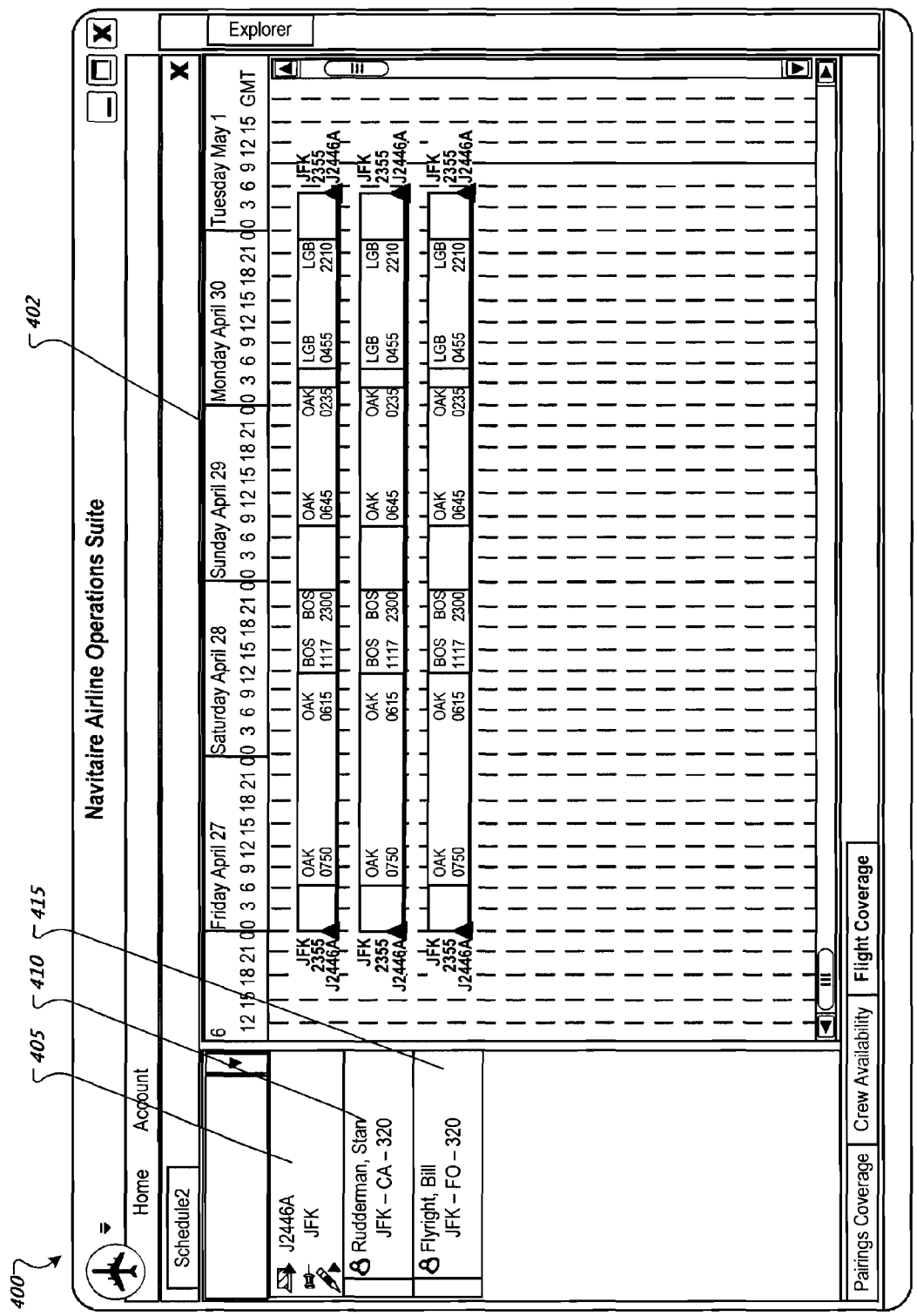
FIGS. 4A through 4C illustrate screen shots of an exemplary user interface for editing pairings.
Figure 4B:
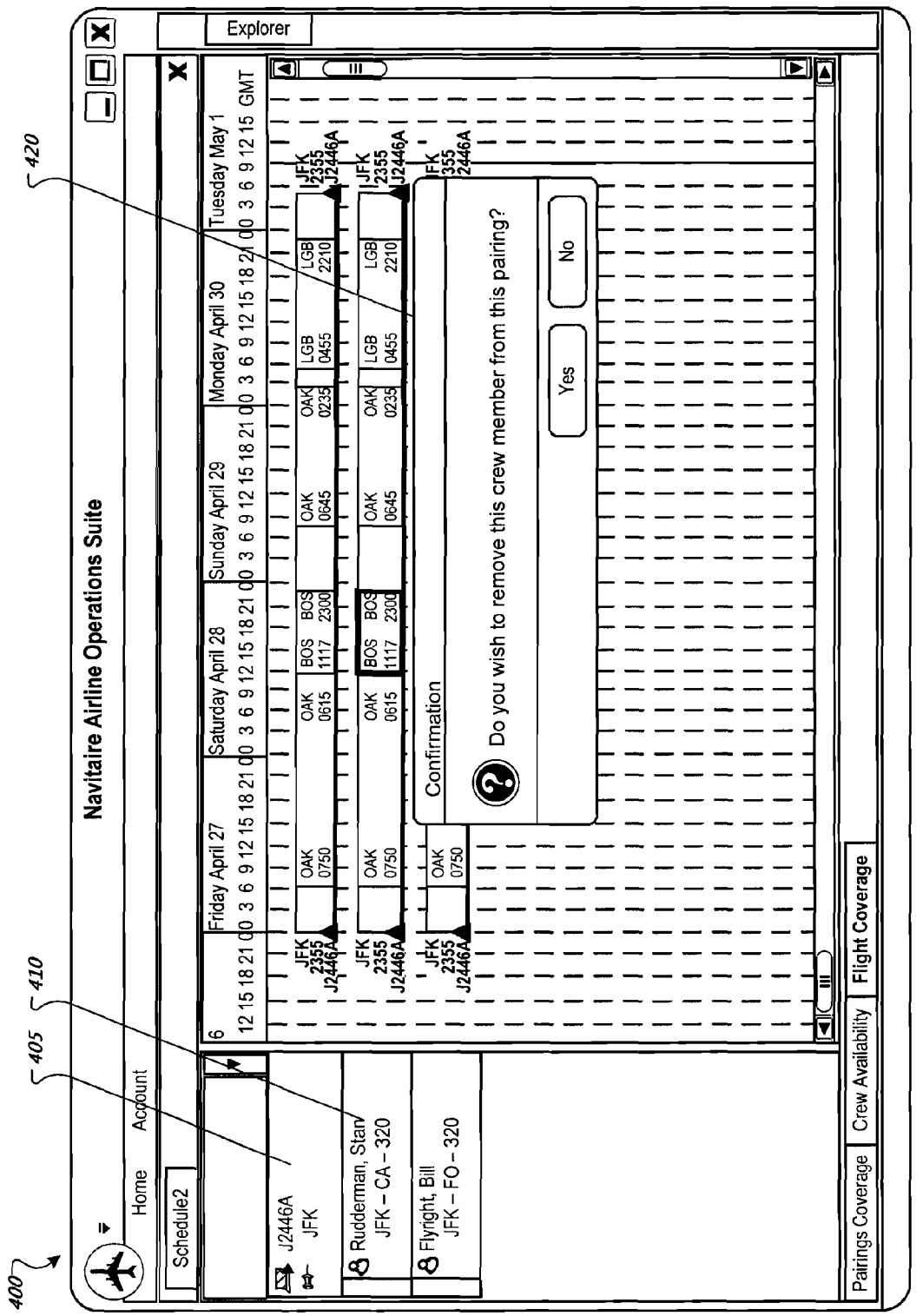
Figure 4C:
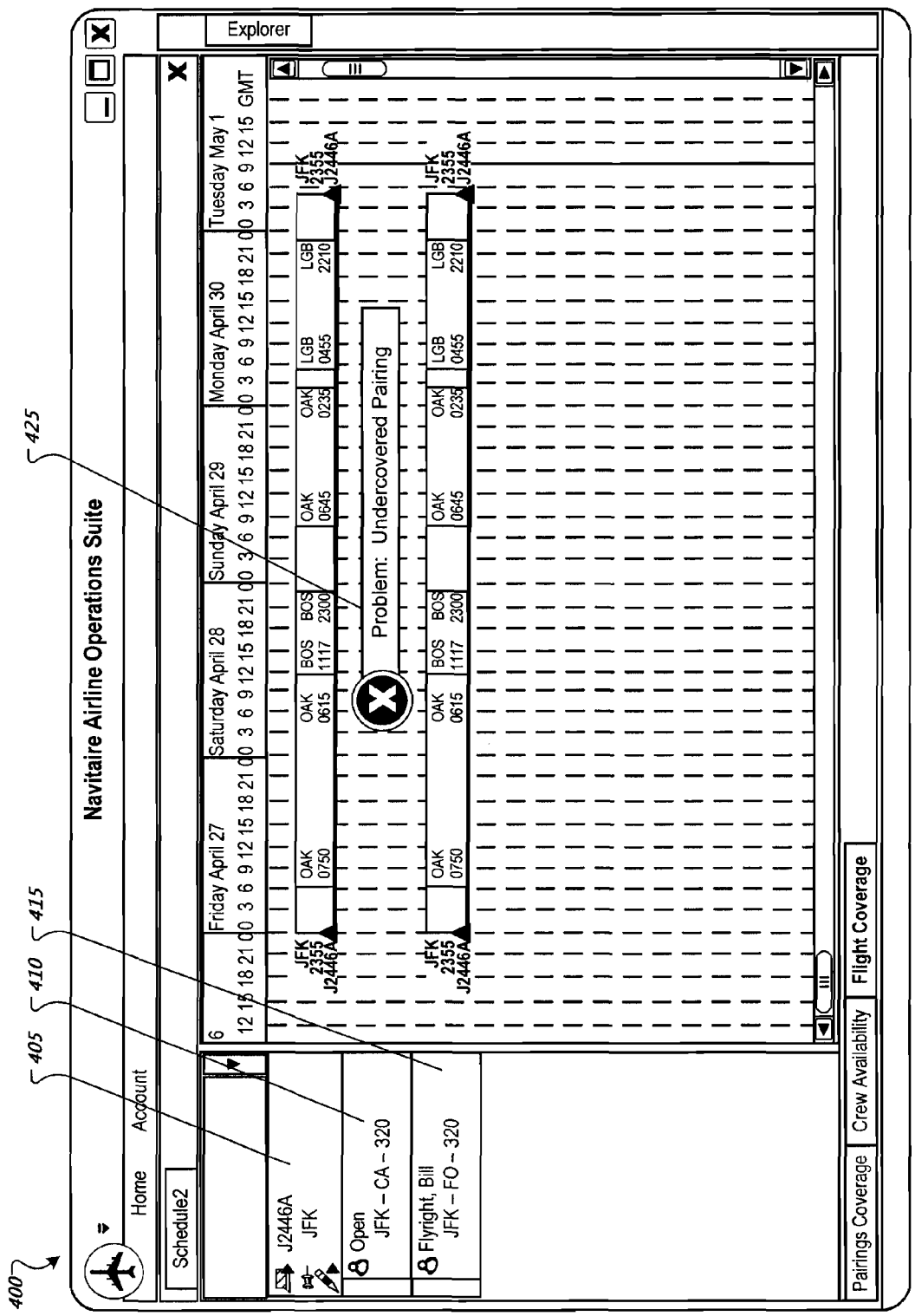

FIGS. 4A through 4C illustrate screen shots of an exemplary user interface (UI) 400 for editing pairings, which screen shots may be provided on a display device for a user such as display device 110 shown in FIG. 1. In some embodiments, the UI 400 may be generated by the airline operations client application 112 of FIG. 1A. The UI 400 includes a Gantt chart 402 of various scheduled flights and/or groups of scheduled flights that have been grouped together. The displayed flights and series of flights constitute various pairings that may either already be filled or that may be revised by subsequent scheduling operations. Using the visual display, a user may select a pairing resource or select a displayed pairing (that is, a flight or series of flights). This may be done, for example, by clicking on a visual representation of the pairing using a pointing device such as a mouse. For example, the UI 400 displays a pairing 405 that includes a captain position 410 and a first officer position 415.

In the FIG. 4A example, the displayed pairing 405 includes a series of five flights, namely, a flight from JFK airport in New York to Oakland (OAK), a flight from Oakland to Boston (BOS), a flight from Boston back to Oakland, a flight from Oakland to Long Beach, Calif. (LGB), and a flight from Long Beach back to JFK airport in New York. In this example, the pairing 405 starts and ends from the same airport, JFK. Airport codes and flight times of departure and arrival are shown for each of the flights of the pairing 405 on strips on the Gantt chart 402. In addition, a unique identifier for the pairing is provided at the beginning and end of strip of the Gantt chart 402. In this example, the identifier is J2446A. The example of FIG. 4A illustrates the first officer position 415 as having been filled with a pilot name Bill Flyright, whereas the captain position 410 is currently filled with a pilot named Stan Rudderman.

As shown in FIG. 4A, there are three Gantt chart strips that are displayed, each representing a pairing. The top strip corresponds to the pairing 405 for all resources associated with the series of flights that are included in the pairing. The middle strip corresponds to the pairing 410 for the captain position for the series of flights that are included in the pairing. The bottom strip corresponds to the pairing 415 for the first officer position for the series of flights that are included in the pairing. In alternative implementations of the UI 400 shown in FIG. 4A, the pairing display strip for the individual crew members may be smaller than pairing for the flight or series of flights.

Turning now to the next screen snapshot 400 of FIG. 4B, there is shown a resulting display following a user having requested to remove the pilot Stan Rudderman from the captain position 410 in the pairing 405 (e.g., by clicking on the captain position 410, contacting a touch screen, or by using a keyboard). The UI 400 responds by presenting a dialog box 420 to request the user to confirm that the crewmember should be removed from the pairing 405.

FIG. 4C is the next in the series of screen snapshots and depicts the exemplary UI 400 after the user has confirmed that the crewmember Stan Rudderman should be removed from the pairing 405. The captain position pairing 410 is now labeled as "open" to indicate that no crewmember is assigned to the captain position 410.

The process of removing the crewmember from the captain position 410 also causes the UI 400 to communicate with a server application (e.g., the airline operations server application 134) and a rules engine (e.g., the rules module 144) to determine if the proposed pairing change causes any rules warning to be issued. In some embodiments, the process of checking for rules violations may occur substantially in real time as the user edits the schedule. The UI 400 displays an error warning 425 to indicate that the pairing 405 is missing a crewmember in the captain position 410.

FIG. 4C illustrates that a user is provided with immediate feedback that a rule has been violated, namely, a rule that requires there to be a captain assigned for every series of flights that are included in a pairing. It will be appreciated that many other example rule violations may occur during a scheduling process, and that may be presented on the user interface to the user performing the scheduling operations.

For example, a user may attempt to schedule a captain for a pairing when that captain would not have had sufficient rest before the first flight of the pairing. In that case, there may be a display of a rule violation that a required or suggested time of rest has been violated. As such, the scheduling user may undo the change before committing it, and may instead schedule a captain who will have had sufficient rest. On the other hand, in some cases the rule may not be mandatory, and the scheduling user may commit the change to the schedule despite the existence of a rule violation. For example, if the rule is simply a suggested time rest period, and not a required one, the scheduling user may nevertheless schedule the pilot for the pairing.

Figure 5:
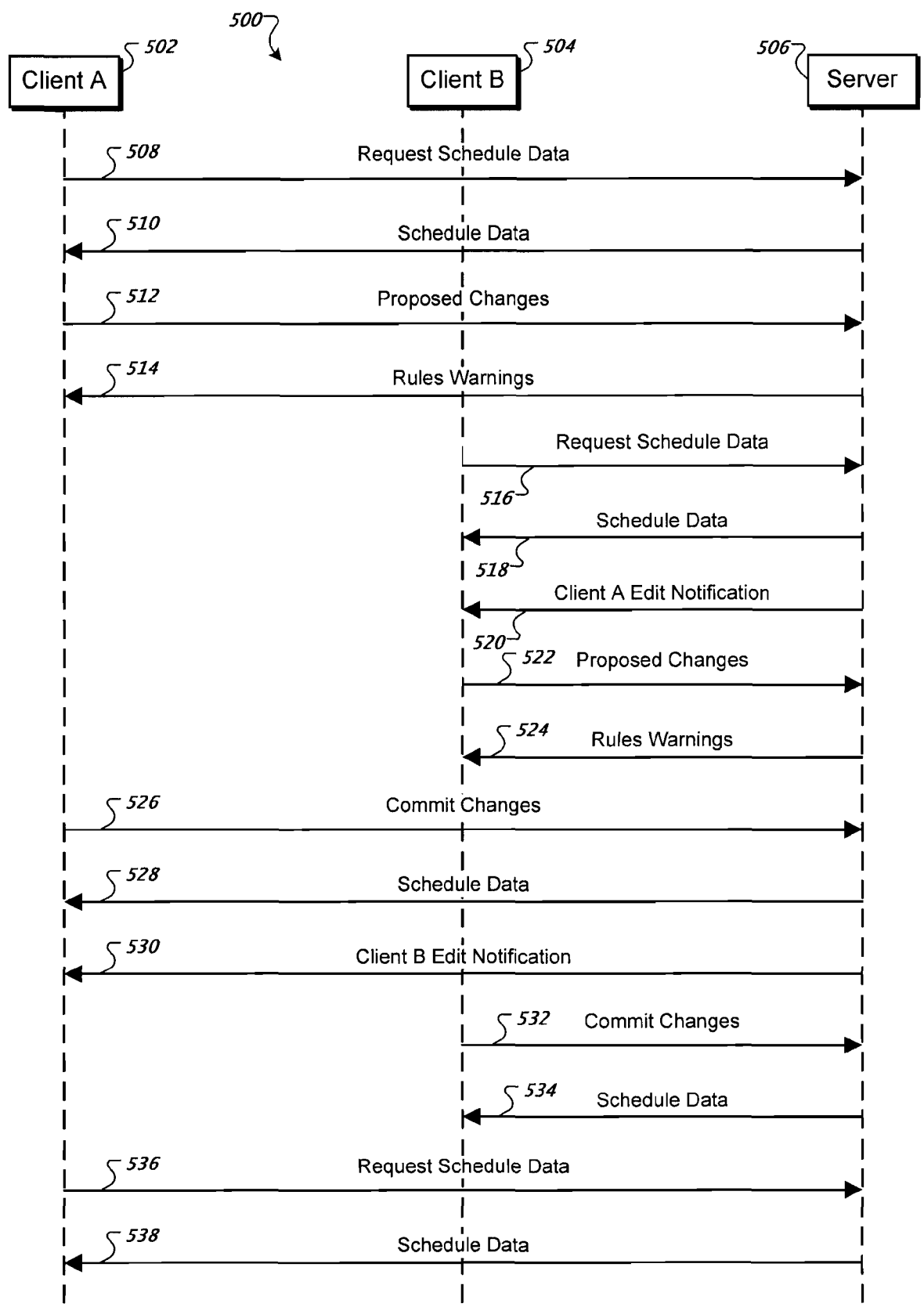
FIG. 5 is a timeline diagram of an exemplary process by which multiple users may edit an airline operations schedule.

FIG. 5 is a flow diagram of an example computer-implemented method 500 in which multiple users are able to edit an airline operations schedule for an airline flight or series of flights at substantially the same time. The process includes operations performed by a client "A" application 502 being operated by a first user, a client "B" application 504 being operated by a second user, and a server application 506. In some embodiments, the client "A" application 502 and the client "B" application 504 may be two separate instances of the airline operations client application 112 of FIG. 1A. In some embodiments, the server application 506 may be the airline operations server application 134.

The method 500 begins with step 508, wherein the client "A" application 502 generates a request for schedule data to be retrieved from the server application 506. The server application 506 responds by returning of the requested schedule data at step 510. The client "A" application 502 generates a visual display of the schedule data on a display device (e.g., the display 110 of FIG. 1A). The visual display may include, for example, a Gantt chart diagram of various scheduled flights and/or groups of scheduled flights that have been grouped together. The displayed flights and series of flights constitute various pairings that either may already be filled or that may be revised by subsequent scheduling operations. Using the visual display, a user would then select a displayed pairing (that is, a flight or series of flights). This may be done, for example, by clicking on a visual representation of the pairing using a pointing device such as a mouse.

At this point, the visual display includes both visual representations of one or more flights or series of flights (with perhaps the selected flights or series of flights highlighted in some way) and visual representations of resources that can be scheduled for the selected flight or series of flights. Using this visual display and an appropriate user input device such as a mouse or keyboard, a user operates the client "A" application 502 to generate and send a set of proposed schedule changes to the server application 506 at step 512. The server application 506 responds to the client "A" application 502 by sending warnings of any rule violations that the proposed schedule changes may cause.

In some embodiments, the client "A" application 502 and the client "B" application 504 may add one or more visual indicators to one or more elements of the schedule (e.g., a pairing) to indicate on the client display device that the local user or a remote user is editing one or more elements of the schedule.

For example, while the user of the client "A" application 502 is editing a pairing, the UI of the client "A" application 502 may display the pairing with a colored highlight to indicate that the user has proposed changes to the pairing. In some embodiments, the visual indication that is applied to pairings that are being edited may use different visual indications to indicate that proposed changes have been made by the local user or a remote user. For example, the user of the client "A" application 502 may see a green icon next to a pairing that is being edited by another user. The user who is editing a pairing in the client "A" application 502 may see the pairing highlighted in red to indicate that another user is editing the same pairing elsewhere.

While the proposed changes of step 512 are pending, the client "B" application 504 makes a request for schedule data at step 516. The server application 506 responds by sending a set of schedule data at step 518. At step 520 the server application 506 sends the client "B" application 504 a notification that the client "A" application 502 has schedule changes that are pending. In some embodiments, the client "B" application 504 may use the notification to cause a portion of the airline schedule to display a visual indication that the portion of the airline schedule is being edited elsewhere.

Next, at step 522 the client "B" application 504 sends a set of proposed schedule changes to the server application 506. The server application 506 responds by sending a set of warnings to indicate any rules that the proposed changes violate.

At step 526, the client "A" application 502 sends a request to commit the schedule changes proposed at step 512. In some embodiments, the client "B" 504 may display the changed pairing with a highlight to indicate that the pairing includes changes that have been committed by the client "A" application 502. The server application 506 commits the changes and responds by sending an updated set of schedule data in step 528. The server application 506 also sends a notification to the client "A" application 502 that the client "B" application 504 has schedule changes that are pending. In some embodiments, the client "A" application 502 and the client "B" application 504 may edit different elements of the airline schedule substantially simultaneously. In some embodiments, the client "A" application 502 and the client "B" application 504 may edit a common element of the airline schedule substantially simultaneously.

At step 532, the client "B" application 504 sends a request to commit the schedule changes that were proposed at step 522. The server application 506 responds by committing the changes and sending updated schedule data back to the client "B" application 504 at step 534.

The client "A" application 502 requests schedule data from the server application 506 at step 536. In some embodiments, the client "A" application 502 and the client "B" application 504 may request schedule data under various conditions. For example, requests for schedule data may be made in response to user interaction with the client applications 502 and 504 (e.g., the user scrolls to a new date in the Gantt chart), or automatically (e.g., on a timer, by a polling process). In some embodiments, the client "A" application 502 and the client "B" application may be updated by notifications sent by the server application 506. For example, updates may be based on real-time updates generated when a change occurs in the pairing due to an action by another user or event such as receipt of updated flight information. The server application 506 responds by sending a collection of schedule data at step 538.

Now referring to FIGS. 6A through 6J, there are shown an example series of screen shots of two instances of a client graphical user interface (UI) for editing an airline operations schedule as provided during the course of the FIG. 5 method 500. A UI 600a is operated by a user identified as "User 1," and a UI 600b is operated by a user identified as "User 2." In some embodiments, the UI 600a and the UI 600b may be instances of the airline operations client application 112 of FIG. 1A. In some embodiments, the UI 600a and the UI 600b may be instances of the UI 400 of FIG. 4. The UI 600a may be provided, for example, at step 510 of FIG. 5, and the UI 600b may be provided at step 518.

Figure 6A:
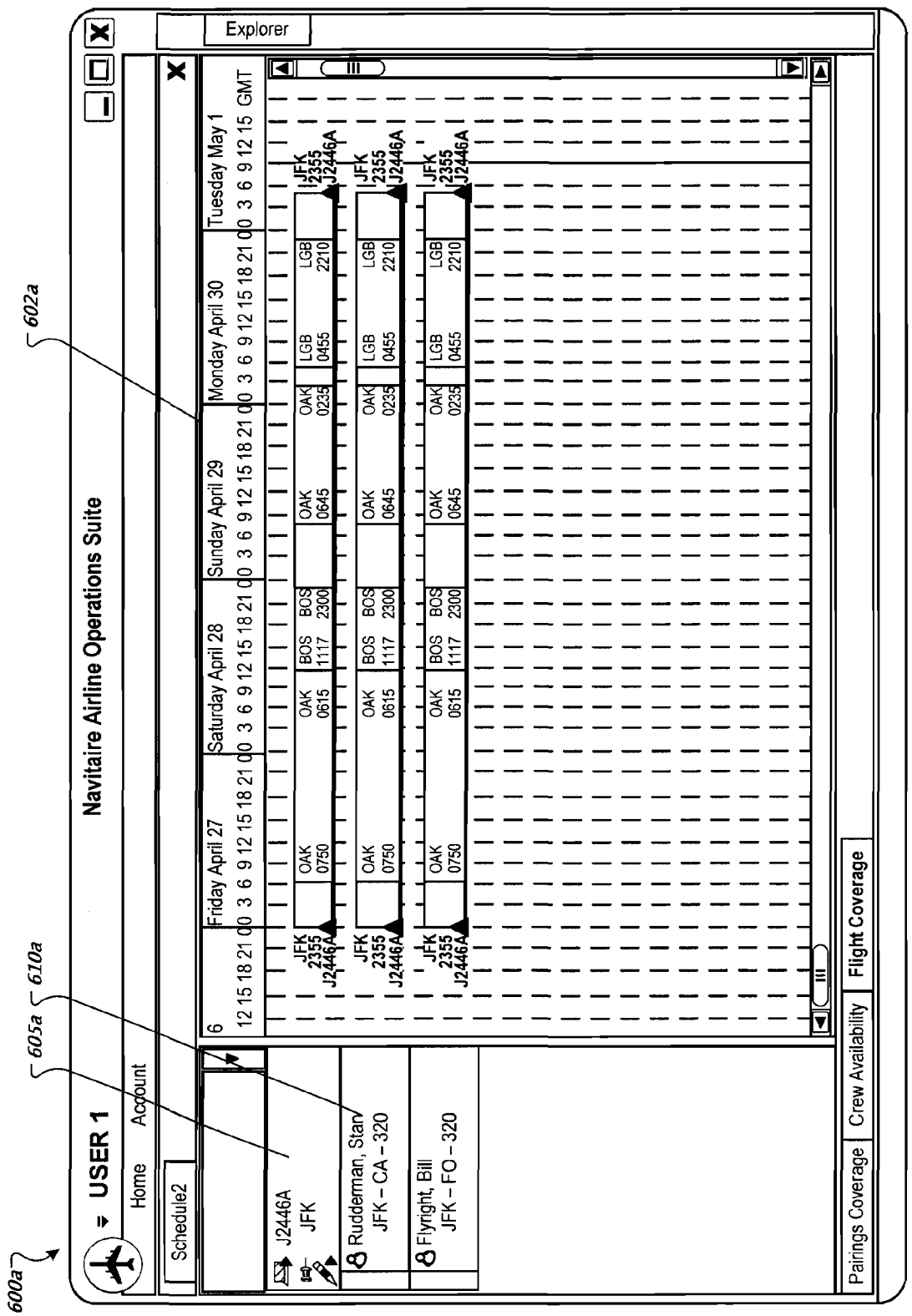
FIGS. 6A through 6J illustrate screen shots of two instances of an exemplary user interface for editing an airline operations schedule.
Figure 6B:
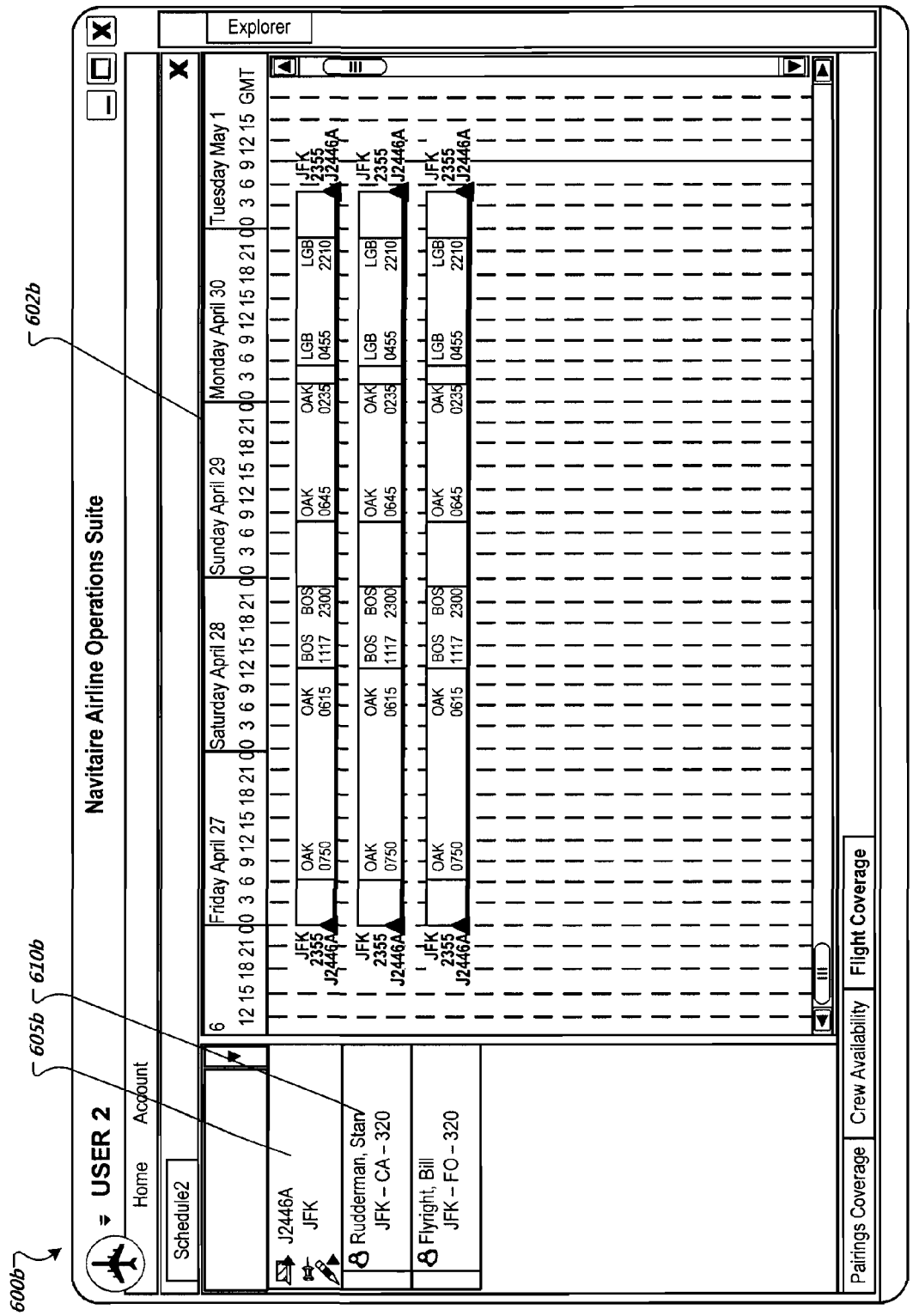

FIGS. 6A and 6B are examples of what is displayed on the UI 600a and the UI 600b at substantially the same time during a first point in time during a multiple user editing process. In FIG. 6A, the UI 600a includes a Gantt chart 602a, a pairing 605a, and a crewmember position 610a. In FIG. 6B, the UI 600b includes a Gantt chart 602b, a pairing 605b, and a crewmember position 610b. In the views illustrated by FIGS. 6A and 6B, the UI 600a and 600b display substantially the same schedule information.

Figure 6C:
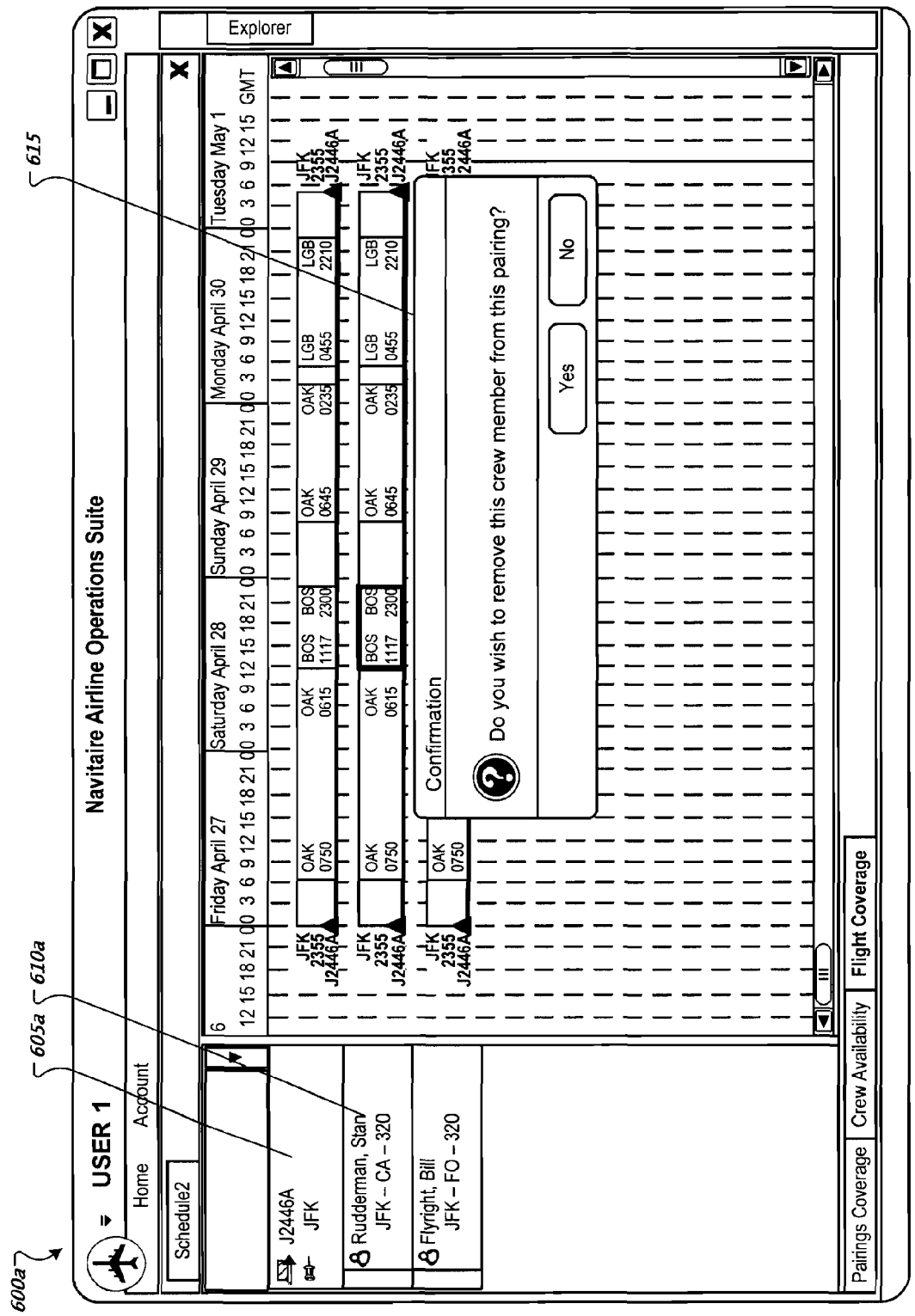
Figure 6D:
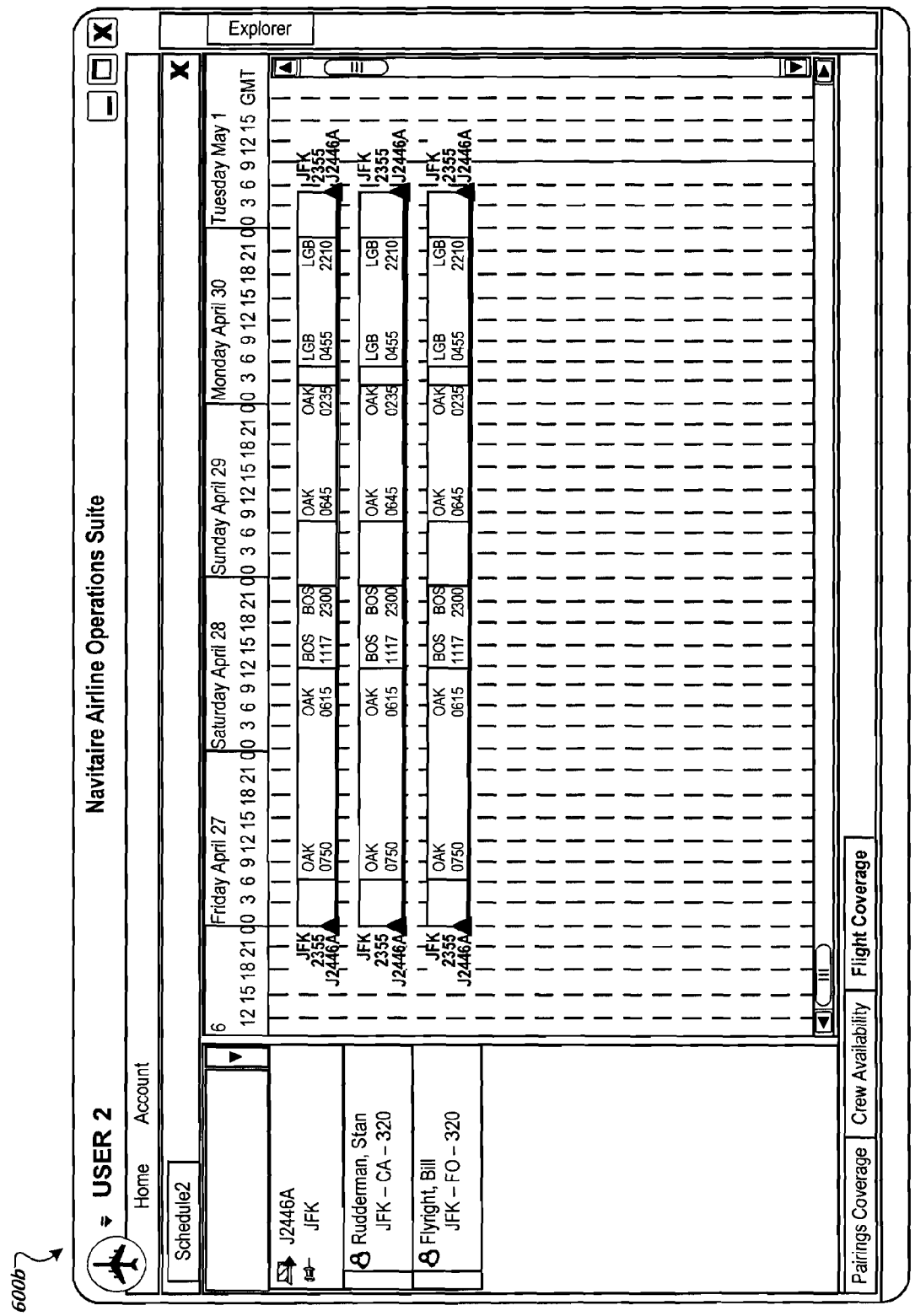

FIGS. 6C and 6D are examples of what is displayed on the UI 600a and the UI 600b at substantially the same time during a second point in time during a multiple user editing process. In FIG. 6C, the user of UI 600a has indicated that the crewmember assigned to the position 610a should be removed (e.g., by clicking a mouse, contacting a touch screen, using a keyboard). The UI 600a presents a dialog box 615 that requests that the user confirm that the crewmember should be proposed to be removed from the position 610a. The UI 600b remains substantially unchanged from the example of FIG. 6B.

Figure 6E:
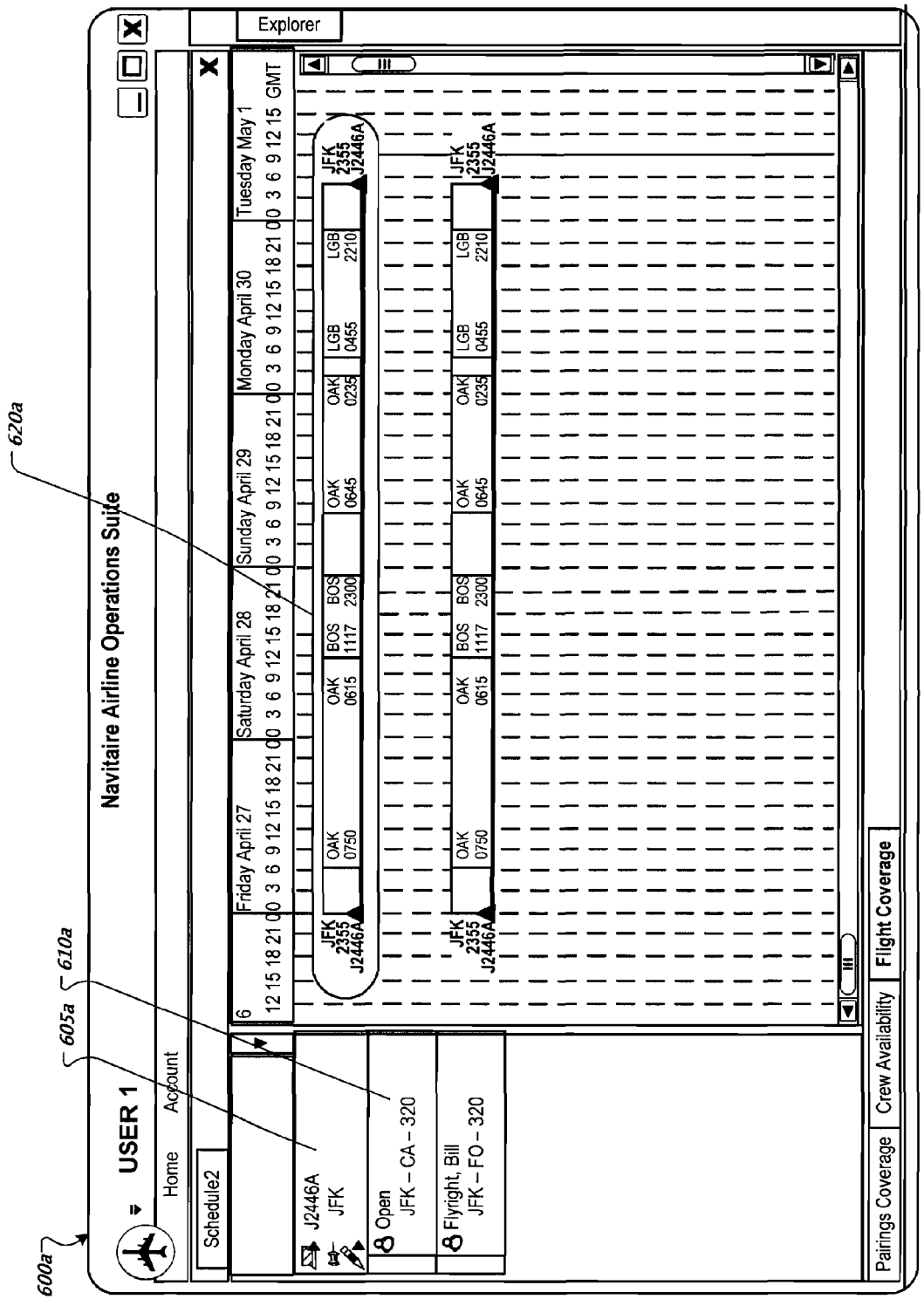
Figure 6F:
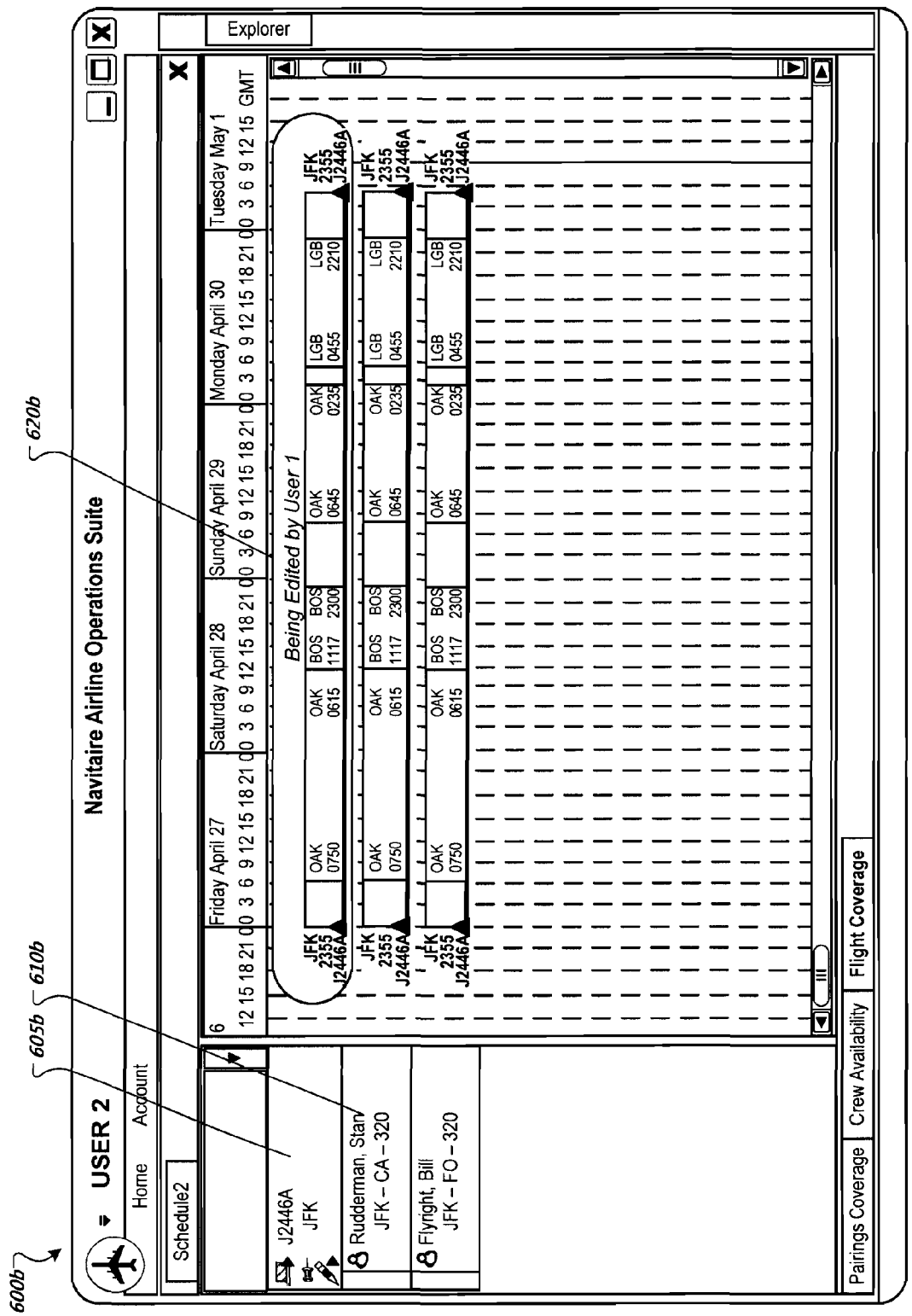

FIGS. 6E and 6F are examples of what is displayed on the UI 600a and the UI 600b at substantially the same time during a third point in time during a multiple user editing process. FIG. 6E shows that the crewmember assigned to position 610a has been removed in the proposed pairing 605a. The UI 600a indicates that the pairing 605a contains changes proposed by the user of the UI 600a by displaying a highlight 620a.

FIG. 6F illustrates the pairing 605b with a highlight 620b. The highlight 620b indicates that the pairing 605b is being edited by the user of the UI 600a. In some embodiments, the highlight 620a and the highlight 620b may use different colors to indicate whether the local user or a remote user has changes pending for an element of the schedule. For example, schedule elements with pending changes proposed by the local user may be highlighted in green, and red highlights may indicate that a remote user has committed changes to a pairing that the local user has also modified.

The examples of FIGS. 6E and 6F illustrate the crewmember position 610a as open and the crewmember position 610b as filled since the user of UI 600a has not committed the proposed change to remove the crewmember that is illustrated in FIG. 6C. In some embodiments, schedule elements that contain proposed changes may use visual indicators other than highlighting. For example, schedule elements with pending changes may be indicated by an outline, shading, a three-dimensional effect, or other indication that may allow a user to differentiate visually a schedule element that includes pending changes from elements that do not.

In some embodiments, schedule elements that contain proposed changes may include other indications to display the statuses of the elements. For example, the indications may include text that indicates the identity of the user who made the proposed changes to the schedule.

Figure 6G:
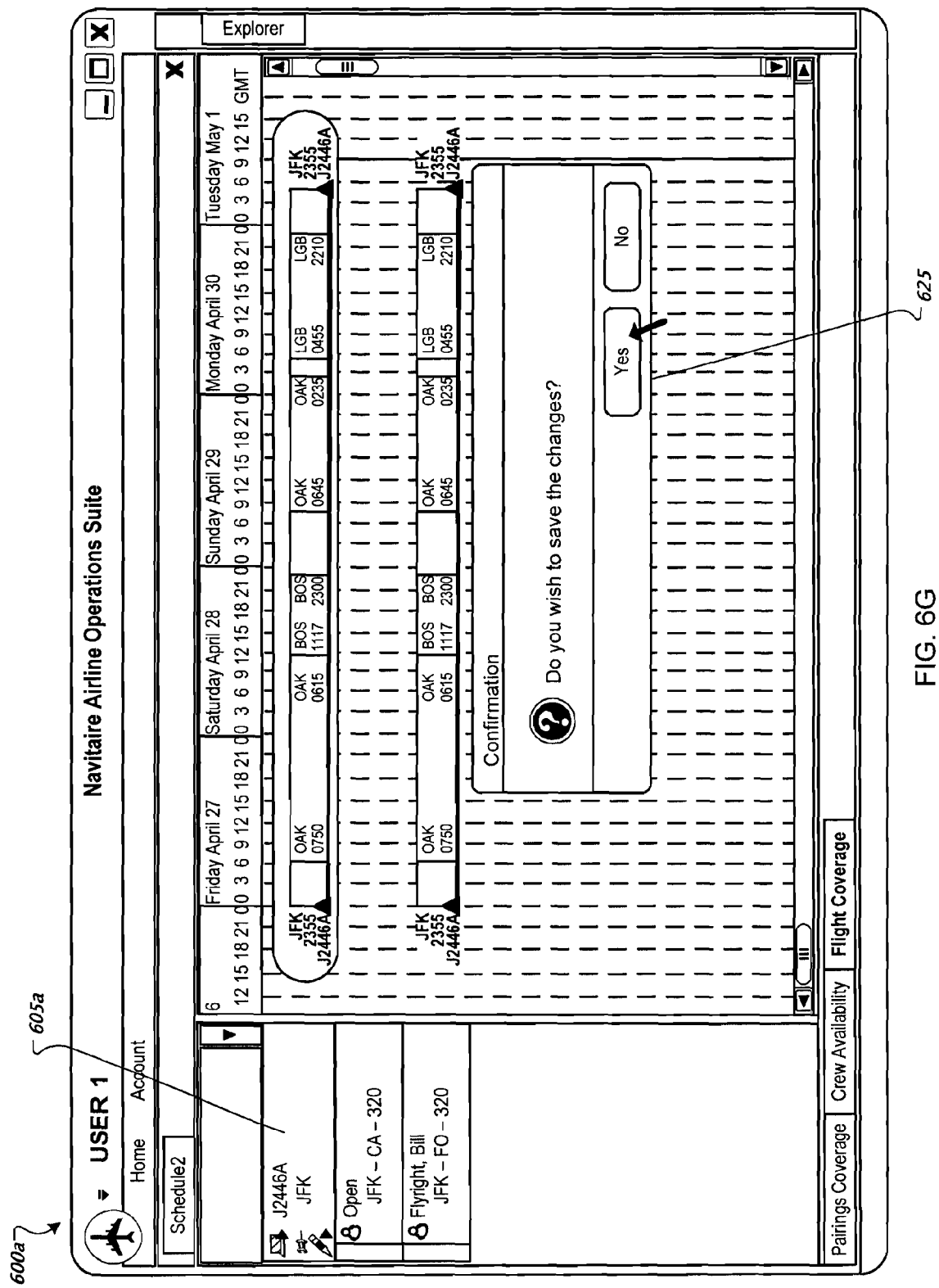
Figure 6H:
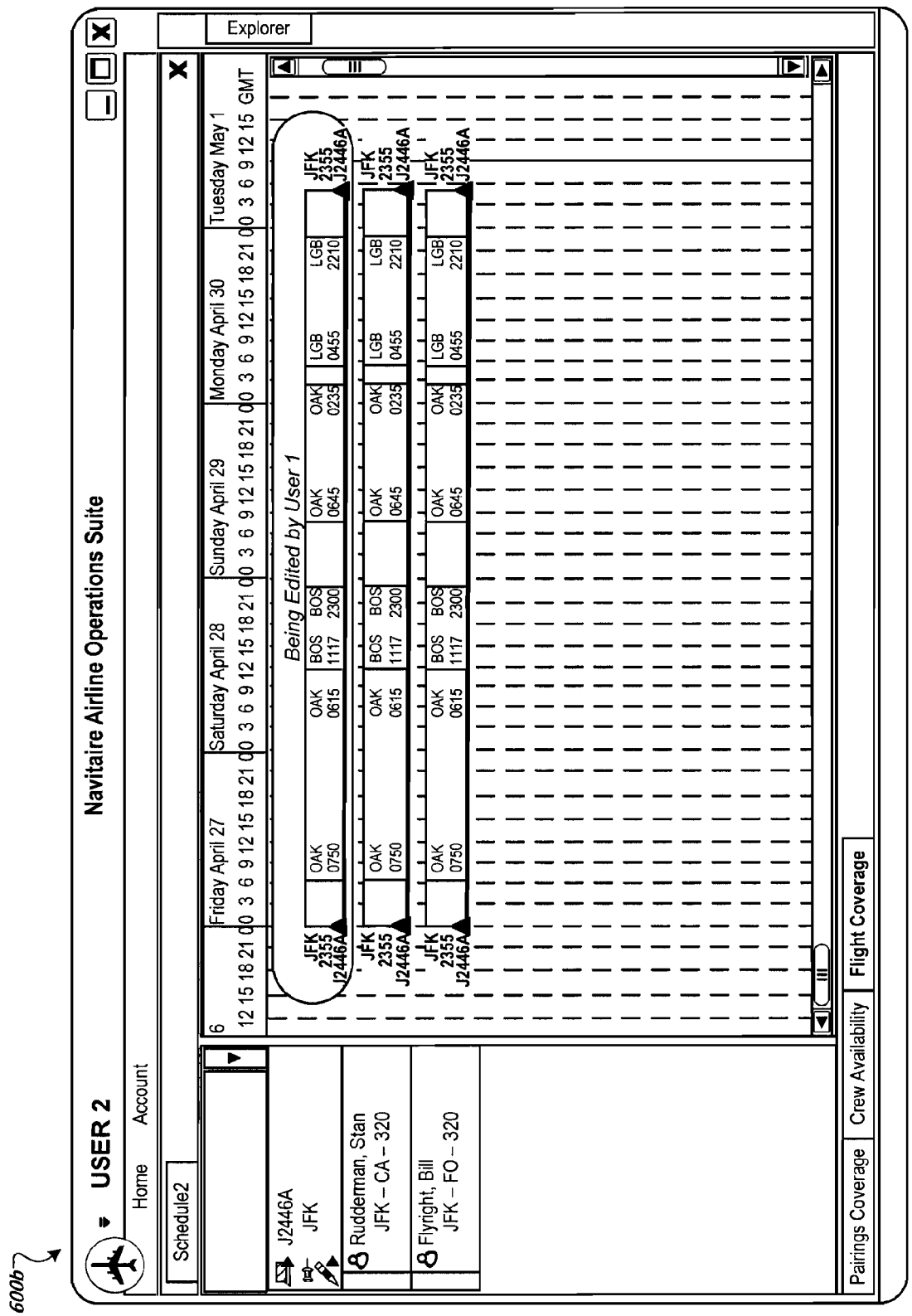

FIGS. 6G and 6H are examples of what is displayed on the UI 600a and the UI 600b at substantially the same time during a fourth point in time during a multiple user editing process. FIG. 6G illustrates the UI 600a displaying a dialog box 625. The dialog box 625 presents a confirmation that the user of UI 600a wants to commit the proposed changes to the pairing 605a. FIG. 6H illustrates that the UI 600b has remained substantially unchanged from the illustration of FIG. 6F.

Figure 6I:
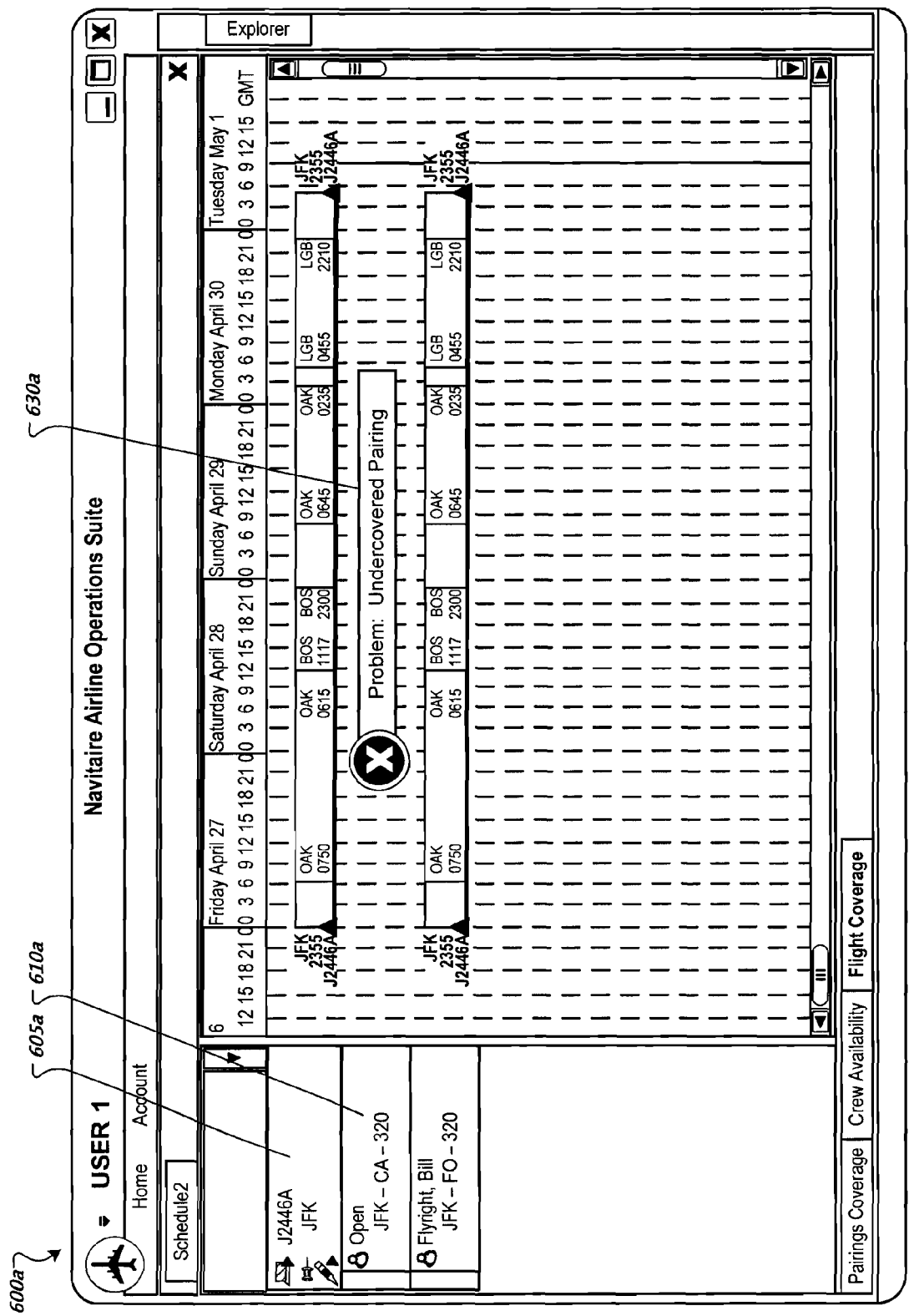
Figure 6J:
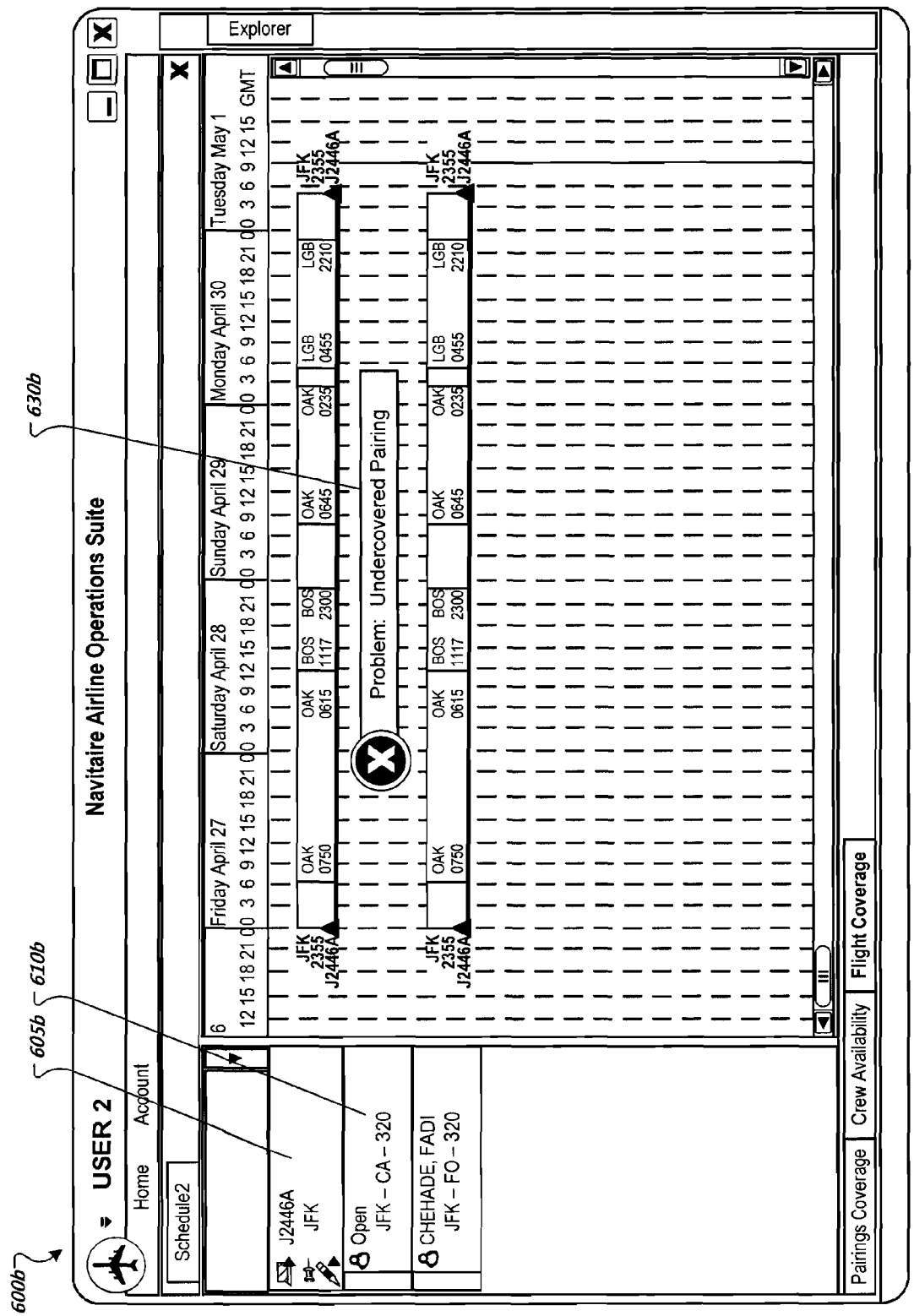

FIGS. 6I and 6J are examples of what is displayed on the UI 600a and the UI 600b at substantially the same time during a fifth point in time during a multiple user editing process. FIG. 6I illustrates that the user has committed the proposed changes to the pairing 605A. The highlights 620a and 620b are no longer visible since the pairing 605a no longer has any pending changes. The UIs 600a and 600b display a rule violation warning 630a and a rule violation warning 630b to indicate that the pairings 605a and 605b are insufficiently staffed.

Figure 7A:
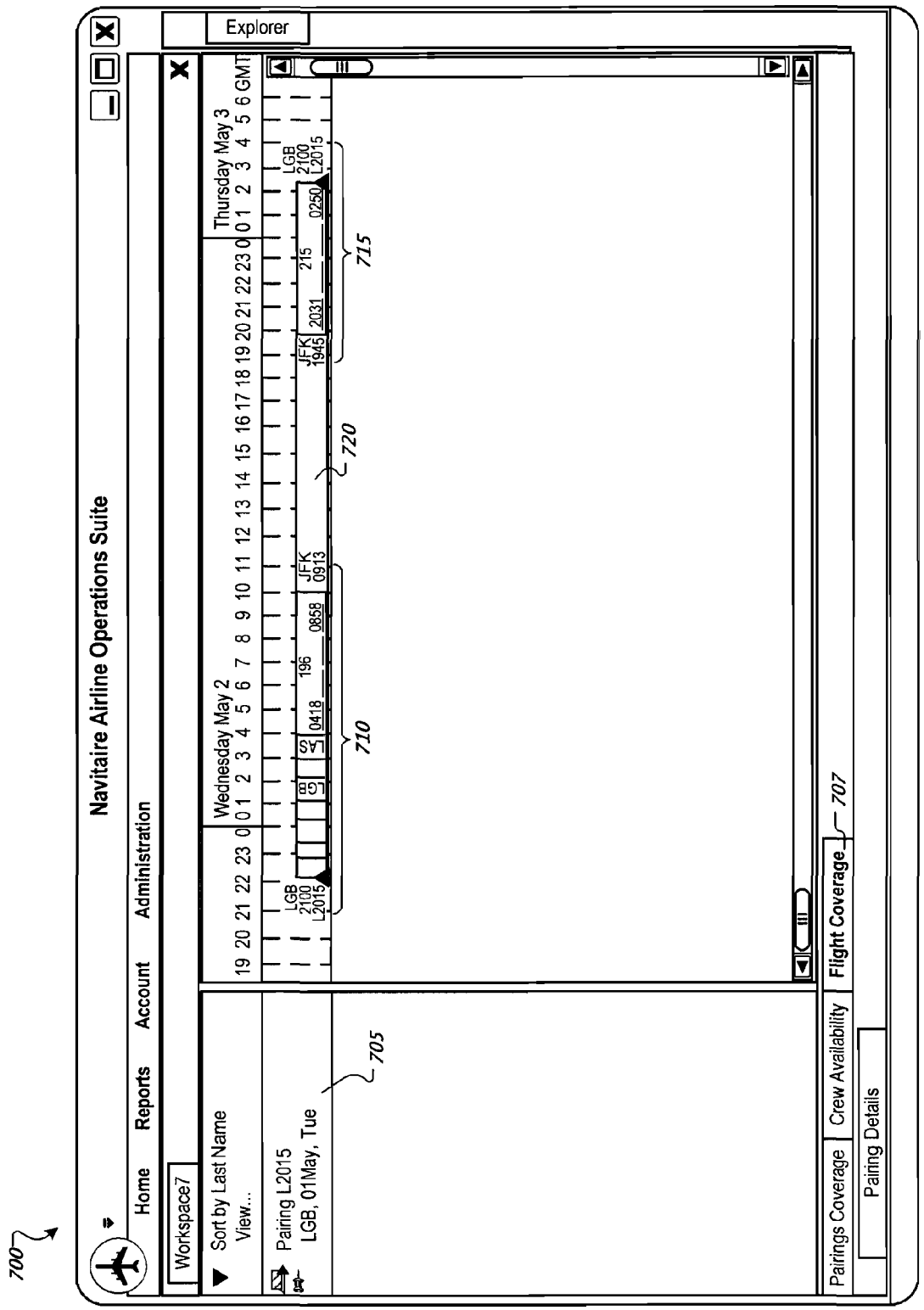
FIGS. 7A-7B are exemplary screen shots of how a pairing may be split into multiple pairings.
Figure 7B:
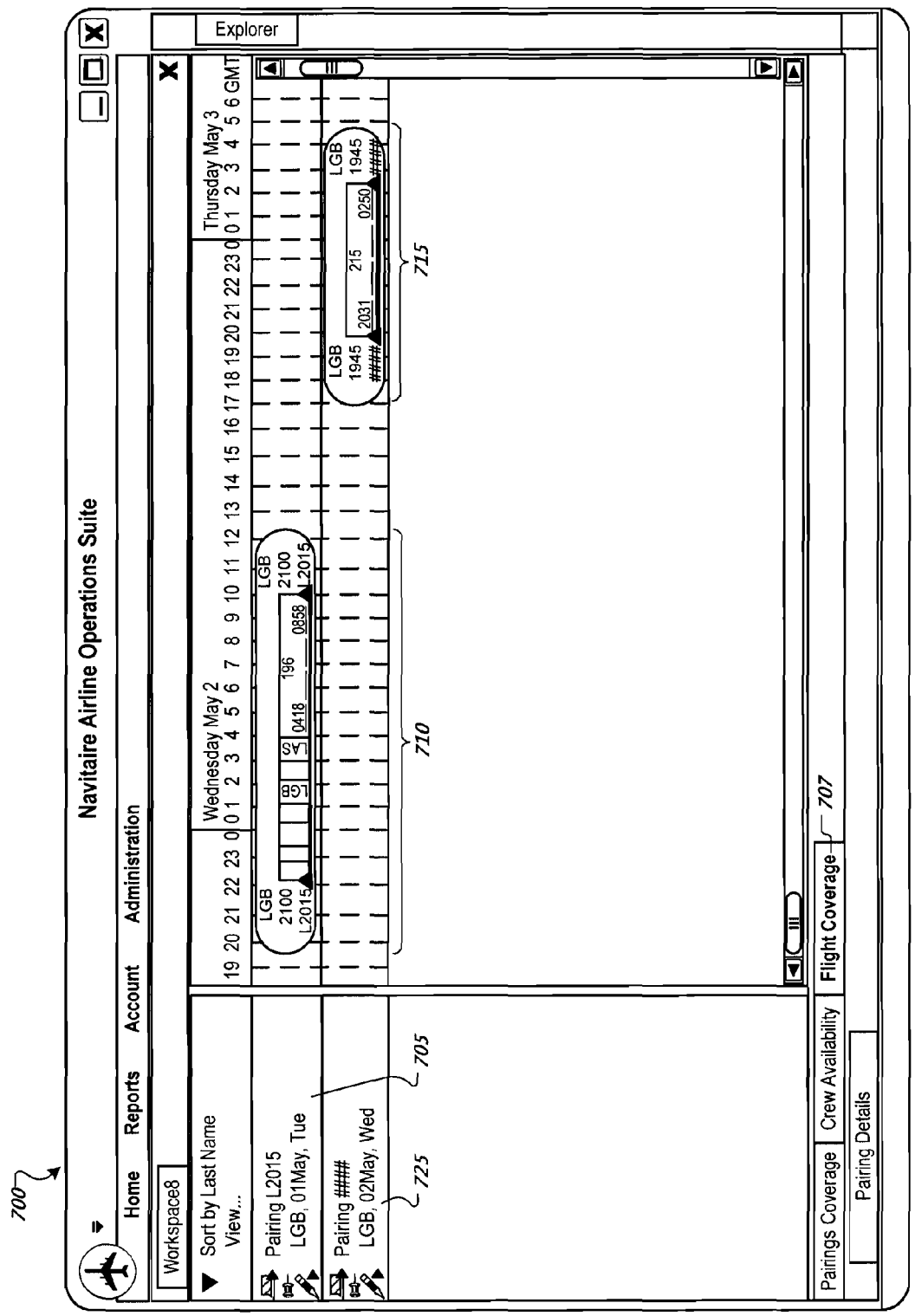

Referring now to FIGS. 7A-7B, there is illustrated functionality for splitting a pairing into two separate pairings. This may be done for a variety of reasons. For example, it may be that one crewmember cannot serve for all of the duties that make up the pairing. FIG. 7A is a screen snapshot of a user interface display 700 of a single pairing 705, pairing number L2015. In that the "flight coverage" tab 707 at the bottom of the user interface is selected, the display 700 shows a list of pairings, although in the FIG. 7A display on one pairing is listed. As shown in the Gantt chart display area, the pairing 705 includes a first series 710 of flights and a second series 715 of flight (the latter being a single flight).

It may be desirable to split the first series 710 from the second series 715 so as to create two pairings from a single pairing. This may be done, for example, by a user entering a command to split a displayed pairing at a particular point in time within the pairing. For example, a user may navigate a pointing device to location 720 and enter a right click operation on the pointing device to provide a display of options, one of which may be a "split" operation. As such, the pairing L2015 may be split at that selected point. Such a "split" operation would produce the user interface display 700 shown in FIG. 7B. As shown there, the first pairing L2015 (numbered 705) includes only one of the two original series, namely, the first series 710, and a new pairing 725 (not yet numbered) is created that is made up of the second series.

Figure 7C:
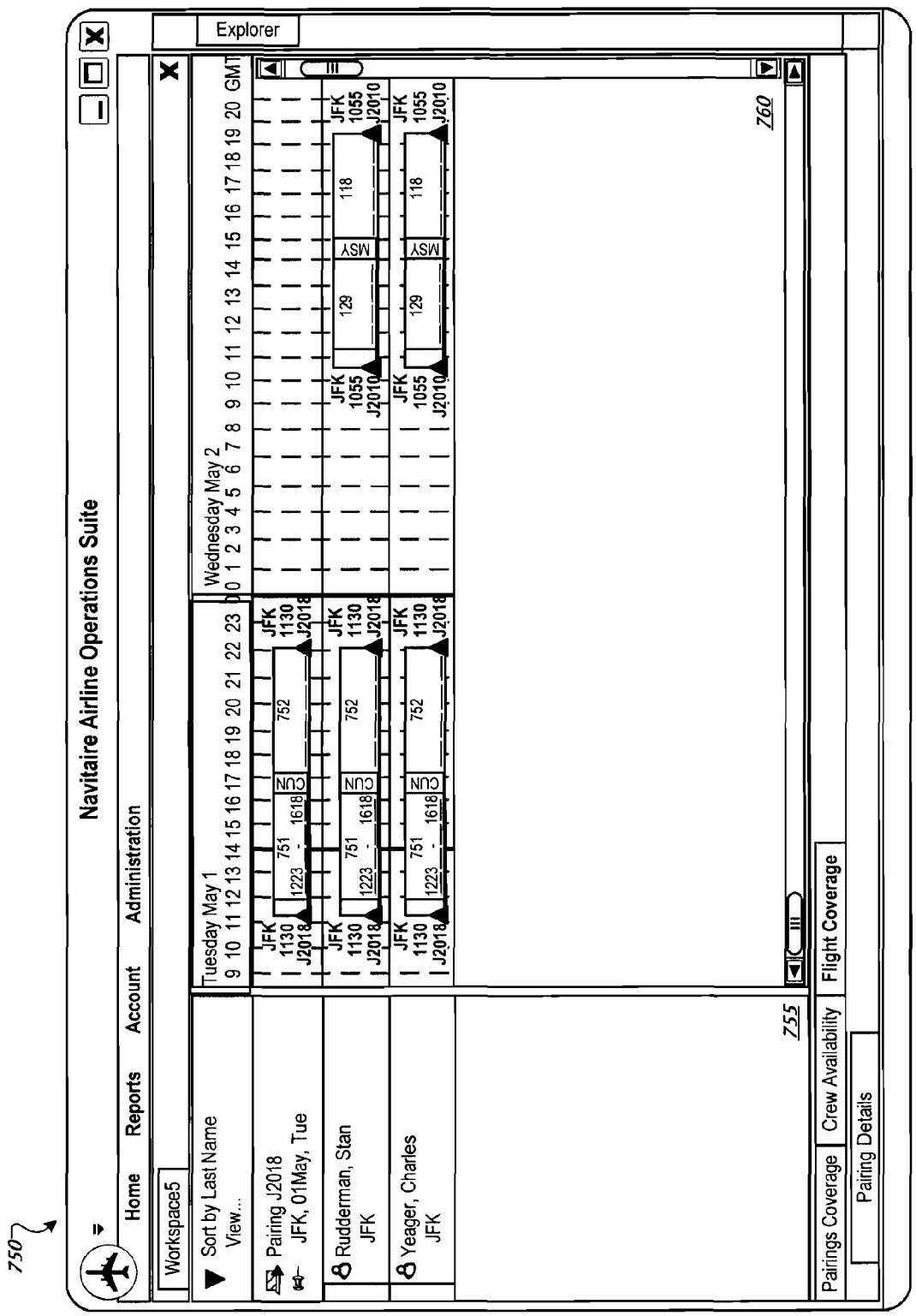
FIG. 7C is an exemplary screen shot showing schedules of a pairing and two crewmembers assigned to the pairing.

Referring now to FIG. 7C, there is shown another user interface display 750 of another useful aspect of the scheduling display features provided in this document. In this display 750, details for pairing J2018 listed in a list area 755 are provided in a Gantt chart display area 760 as in previously described displays. The Gannt chart display area 760 has a horizontal time axis, and in the FIG. 7C display, May $1^{st}$ and May $2^{nd}$ are displayed. In the list area 755 there is listed two crewmembers Stan Rudderman and Charles Yeager that are assigned to the pairing J2018. The display shown in FIG. 7C of assigned crewmembers may be generated under a pairing using, for example, an "expand" feature.

Pairing J2018 in the FIG. 7C example includes two flights, both of which are scheduled for May 1. As such, the pairing J2018 includes only a single duty on a single day. The crewmembers' schedules are shown in the Gantt chart display area 760 in their entirety, and not just the parts of the crewmembers' schedules that are included in the pairing. As can be seen, both crewmembers shown in FIG. 7C are also assigned to another pairing the next day, May 2. The pairing to which they are assigned is pairing number J2010. As such, the constraints of crewmembers assigned to a pairing can be seen by a scheduler, which may be useful if, for example, the crewmember may wish to revise the pairing in some way.

Figure 8:
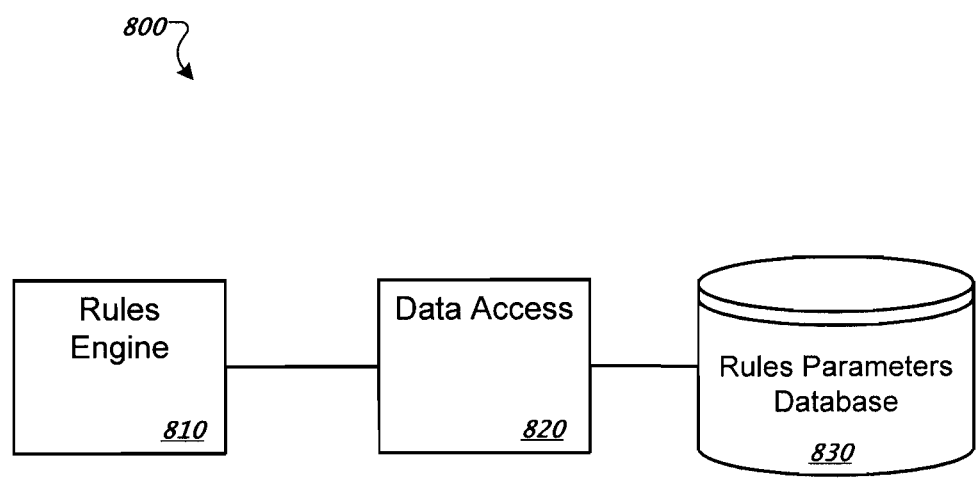
FIG. 8 illustrates an exemplary rules processing system.

FIG. 8 illustrates an exemplary computer implemented rules processing system 800. The system 800 includes a rules engine 810, a data access module 820, and a rules parameters database 830. In some embodiments, the rules engine may be the rules module 144 of FIG. 1A. In some embodiments, the data access module may be the data access module 152. In some embodiments, the rules parameters database may be the rule database 164 of FIG. 1B.

The rules engine 810 provides functions that check pairings to determine if a pairing violates a rule. For example, the rules engine may determine that a pairing may require an airline crewmember to fly in excess of a maximum number of hours without a rest period. In another example, the rules engine may detect that a pairing does not have all the required crewmember positions filled. Other examples of rules were previously described in relation to the rules module 144 of FIG. 1A.

The data access module 820 includes functions that the rules engine 810 uses to access the rules parameters database 830 and the rules parameters that the database 830 stores. For example, the data access module 820 may perform functions that are specific to the database engine or the structure used by the rules parameters database 830 while presenting a more generalized set of features to use by the rules engine 810.

The rules engine 810 includes rules that are based upon limits, ratios, averages, or other criteria that may be used to define a rule. For example, the rules engine 810 may contain a rule that, when put in plain language, states "a pilot may not fly more than 'X' hours per month," where the value of 'X' is a variable. The specific value of the variable 'X' is stored as a rule parameter in the rules parameters database 830. The rules engine 810 uses the data access module 820 to request rules parameters (e.g., the value of the variable 'X') from the rules parameters database 830.

Figure 9A:
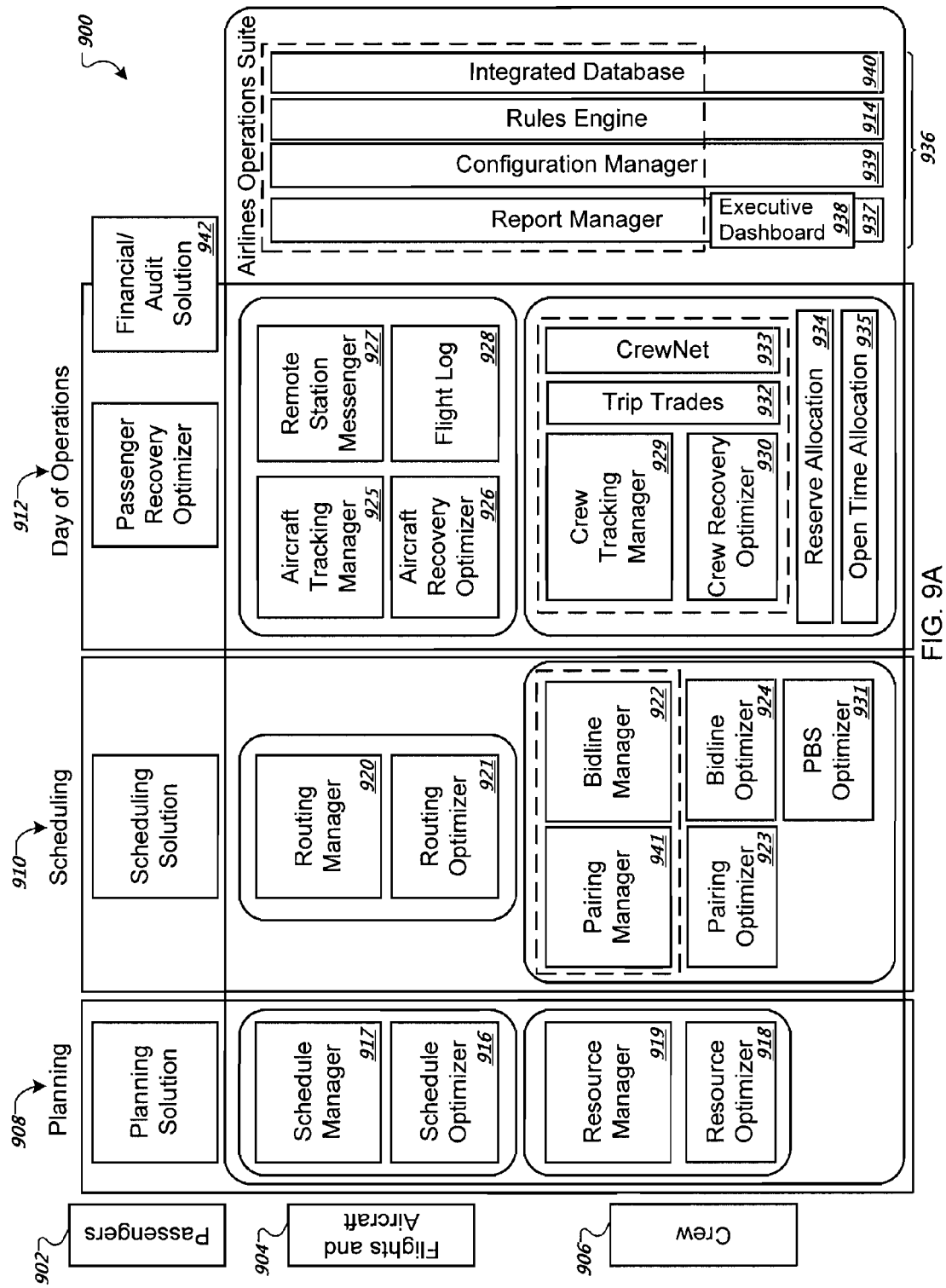
FIG. 9A is a block diagram of an airline operations computing system incorporating a common rules engine.

In another aspect, the airline operations suite previously described may include a common rules database, as is depicted in FIG. 9A. An example of a fully integrated operations solution 900, shown in FIG. 9A, includes various software modules and other computing resources as previously described. As indicated in FIG. 9A on the left-hand side, the system has modules that perform functions related to passengers 902, flights and aircraft 904, and crew 906. In addition, and as indicated along the top of the figure, the system has modules that are used during planning (for example, long-range planning) 908, scheduling 910, and day of operations 912 (for example, where there may be disruptions that require changes to be made).

The complete product suite represented in the systems shown in FIG. 9A and elsewhere in this document encompasses the functionality to manage the entire life cycle of pairings, schedules, and crews from planning, to scheduling, to operations, and finally to historical records. The historical records are needed in many cases because some rules require knowledge of what the crew or aircraft did in the past (for example, calendar year block limits on pilots). It would be desirable that the rules in each phase of the life cycle (planning, scheduling, and operations) be consistent, and in many cases be identical or very close resemblance. For example, suppose an operations rule is that a pilot may not accumulate more than eight hours of block time in a duty. If planning were to use a rule where this were set to nine hours, then pairings may be created in which operations cannot legally assign to crews. Another example in one implementation is that for planning and scheduling purposes, a duty may not exceed twelve hours, but in operations, it is possible to alleviate this limitation and allow 14 hours of duty (under certain circumstances). The use of a common rules database allows the various components in the system to share rules where appropriate and thereby avoid introducing inconsistencies or requiring that redundant rules be created and managed.

The system diagram shown in FIG. 9A shows the various optimizers and the single, or common, rules engine 914 (shown near the right-hand side of the diagram). The various optimizers also shown in FIG. 9A are used for various different functions that are performed by the operations computing system. For example, there is a schedule optimizer 916 that is used for planning actions (as indicated on the top of FIG. 9A), and that is used for functions related to flights and aircraft (as indicated on the left side of FIG. 9A). This optimizer 916, for example, may be used to generate schedules that maximize the airline revenue and that minimize the operational cost. In addition, the schedule optimizer may provide "what if" capabilities for additional flights and equipment. In a sense, the optimizers perform not only what may be referred to as back-end computer processing optimization processing, but also serve as a decision support tool that supports the evaluation, and optimization, of various alternatives. A schedule manager software application 917 may be used for planning flights and aircraft.

Another optimizer for planning 908 and for crew 906 is a resource optimizer 918, and a resource manager software application 919 may be used for crew planning. In addition, the resource optimizer 918 may include a roster optimizer (not shown) that generates equitable and highly productive crew rosters that cover all the flights in the roster period while taking into account pre-assigned crew activities. In addition to parameters in the integrated rules engine 914, crew planners can input lower and upper bounds and penalties to control the amount of block time, duty time and pay allowances desired in the rosters. The roster optimizer may use this information to calculate an optimized solution.

For scheduling flights and aircraft there is a routing manager 920 and a routing optimizer 92 1. The aircraft routing optimizer 921 helps flight schedulers build optimal daily, weekly or fully dated aircraft routings for a given flight schedule. For example, it assigns individual flights into anonymous lines of flying to minimize the number of lines required to operate the schedule while maximizing route consistency. For further optimization, the routing optimizer 921 may integrate with a pairing optimizer 923, discussed below, to generate easily crew schedules that follow aircraft routings.

For scheduling crew there is a pairing manager software application 922 and a software application 922, called a bidline manager, that manages bids from crewmembers for specific flights and duties. In addition, there is a pairing optimizer 923 and a bidline optimizer 924.

The pairing optimizer 923 automatically creates the lowest-cost set of crew pairings for flights operated within a specified timeframe. This fast, flexible optimizer 923 may incorporate user-controlled parameters that include a wide variety of both "hard" crew rules and "soft" crew quality-of-life elements. The routing optimizer 923 also enables crew planners to generate pairings for combined international and domestic schedules, automatically enforcing both sets of rules and allowing specification of additional global constraints. The bidline optimizer 924 develops generic bidlines for each period that are ready for the crew bidding process. It incorporates multiple flexible parameters to accommodate seniority-based environments and create schedules that meet desired trip attributes. The bidline optimizer 924 may build both bidline-holder and reserve bidline schedules to meet minimum guarantee levels. Once a bidline is committed, crew planners may directly input the bidline into the crew bidding system without additional configuration. In addition or alternative to the bidline optimizer 924, there may be a personal, or preferential, bidding system (PBS) optimizer 931 that takes into account crew preferences and the like.

For the day of operations 912, there is an aircraft tracking manager software application 925 for tracking aircraft locations and status. In connection with this software application there is an aircraft recovery optimizer 926. In addition for flight and aircraft day of operations there is a remote station messenger software application 927 and a flight log software application 928. For crew on the day of operations, there is a crew tracking manager software application 929 and accompanying crew recovery optimizer 930. In addition, there is a trip trades application 932 that enables and manages trades between crewmembers of trips, and a crewnet application 933 that may be an online interactive medium that allows crew to participate in schedule bidding, view their work schedules and receive crew administration messages via the Internet.

One of the factors that impacts delays is the lack of excess capacity where it is needed. As shown in FIG. 9A, there may be a reserve allocation application 934 and an open time allocation application 935 to manage capacity of crew resources that are either unscheduled or that have open time.

The airline operations suite 900 of FIG. 9A has central or common tools 936 shown conceptually in FIG. 9A at the right of the diagram. These components may be integrated with some or all of the specific function components in the suit 900. These common tools 936 include the rules engine 914 previously discussed. In addition, the common tools 936 include a report manager to generate reports of data, as well as an accompanying dashboard application 938 that may be used to display the generated reports and provide other information. In addition, there is a configuration manager 914 and an integrated database 940. Finally as shown in FIG. 9A there is a financial or audit solution 942.

Figure 9B:
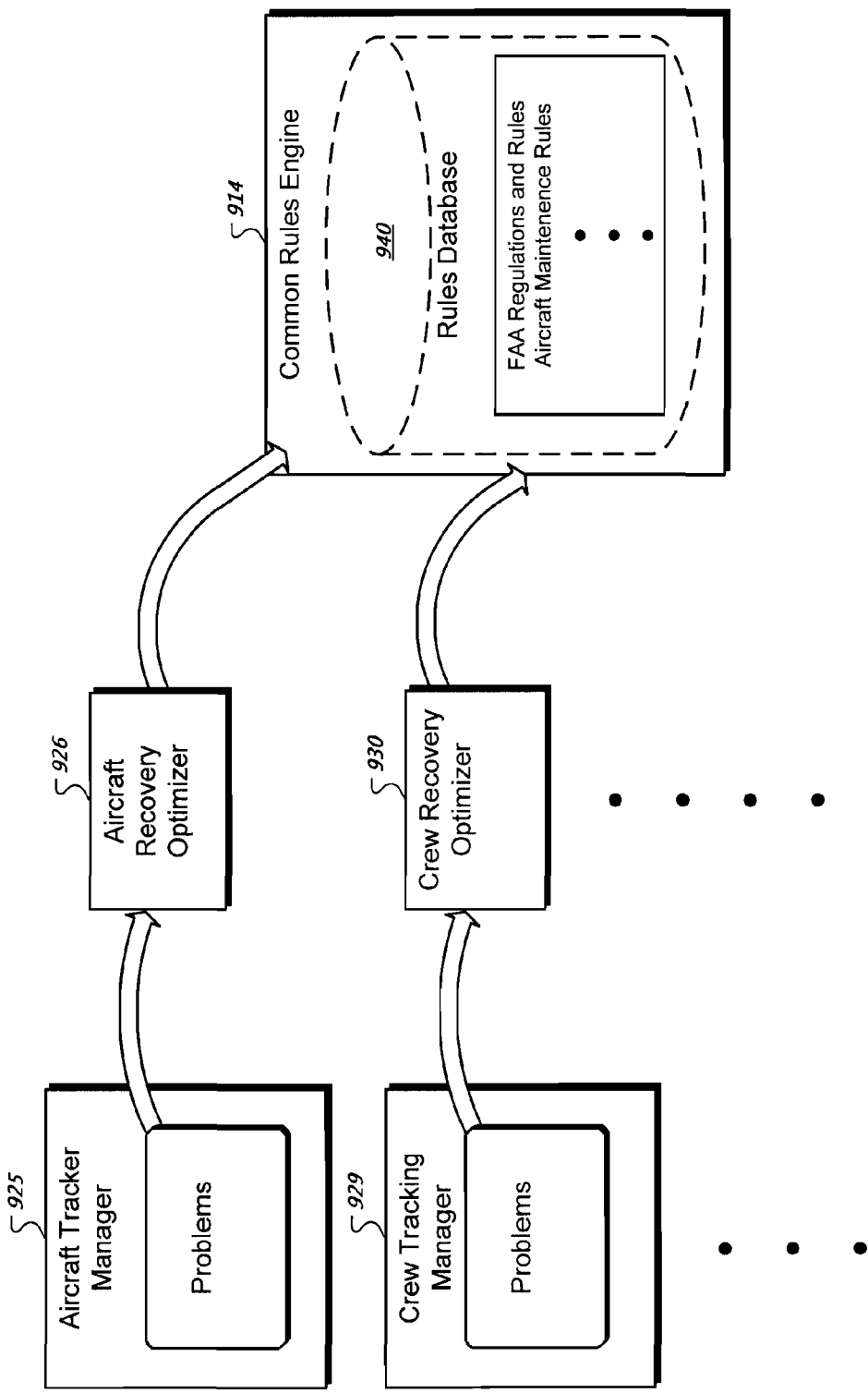
FIG. 9B is a block diagram of parts of the system of FIG. 9A including a common rules engine.

The single, or common, rules engine 914 shown in FIG. 9A may be used by each of the optimizers in the manner shown in FIG. 9B. For simplicity, FIG. 9B shows two of the optimizers—the aircraft recovery optimizer 926 and the crew recovery optimizer 930—from FIG. 9A, and how they relate to the common rules engine 914. As shown in FIG. 9B, all of the optimizers make use of the common rules engine 914. The common rules engine includes a rules database 940. Example rules include Federal Aviation Administration regulations that, for example, mandate how long crews are able to work or be on duty. Other example rules may include rules as to how often an aircraft is required to receive various types of maintenance, the nature of that maintenance, and where that maintenance may occur (or in other words, where the aircraft needs to be to have that maintenance performed on it).

As shown in FIG. 9B, an optimizer 926 or 930 receives input from a corresponding manager 925 or 929 that may have, for example, identified a problem that needs to be resolved. For example, an aircraft recovery optimizer 926 may receive inputs from an aircraft tracking manager 925. The aircraft tracking manager 925 may receive an input indicating that a certain aircraft has been delayed because of mechanical problems. This may pose a scheduling problem, which would be identified by the aircraft tracking manager. The aircraft tracking manager module may then provide input information to the aircraft recovery optimizer 926, as shown in FIG. 9B. Through this input information, the aircraft tracking manager 925 may have determined the flight number that has been delayed and how long that delay is expected to be. In response, the aircraft recovery optimizer 926, perhaps under user control, may be used to determine a solution to the problem.

During the course of determining a solution, the aircraft recovery optimizer 926 may make various calls to the common rules engine 914, for example, to determine if various proposed solutions violate any of the rules, with respect to crew rules, aircraft maintenance rules, etc. As such, it can be seen that the rules in the common rules database 940 may have applicability to many of the different optimizers. As such, the common rules database 940 is leveraged in a very efficient and effective manner.

In another aspect of the airline operations computing system described in the present application, there is provided an embedded solver technology where the solver is transparent to users. By way of background, crew and tracking systems have traditionally required that human users of the system "poll" the system for any problems; if any problems are found, the user is responsible for identifying potential "fixes," selecting the fix(es) to be applied, and putting them together in an overall solution. This is an entirely manual process, albeit with some limited search functionality in many cases being provided by the tracking system. So-called "solver" technologies have also been integrated into airline operations computing systems. Such solvers are capable of identifying and selecting fixes to be included in the overall solution. Even with such solvers integrated into the system, such systems still require that the users monitor the system for problems, and that the users specifically invoke the solvers to generate a solution (and then committing the solution back to the tracking system when completed).

Figure 9C:
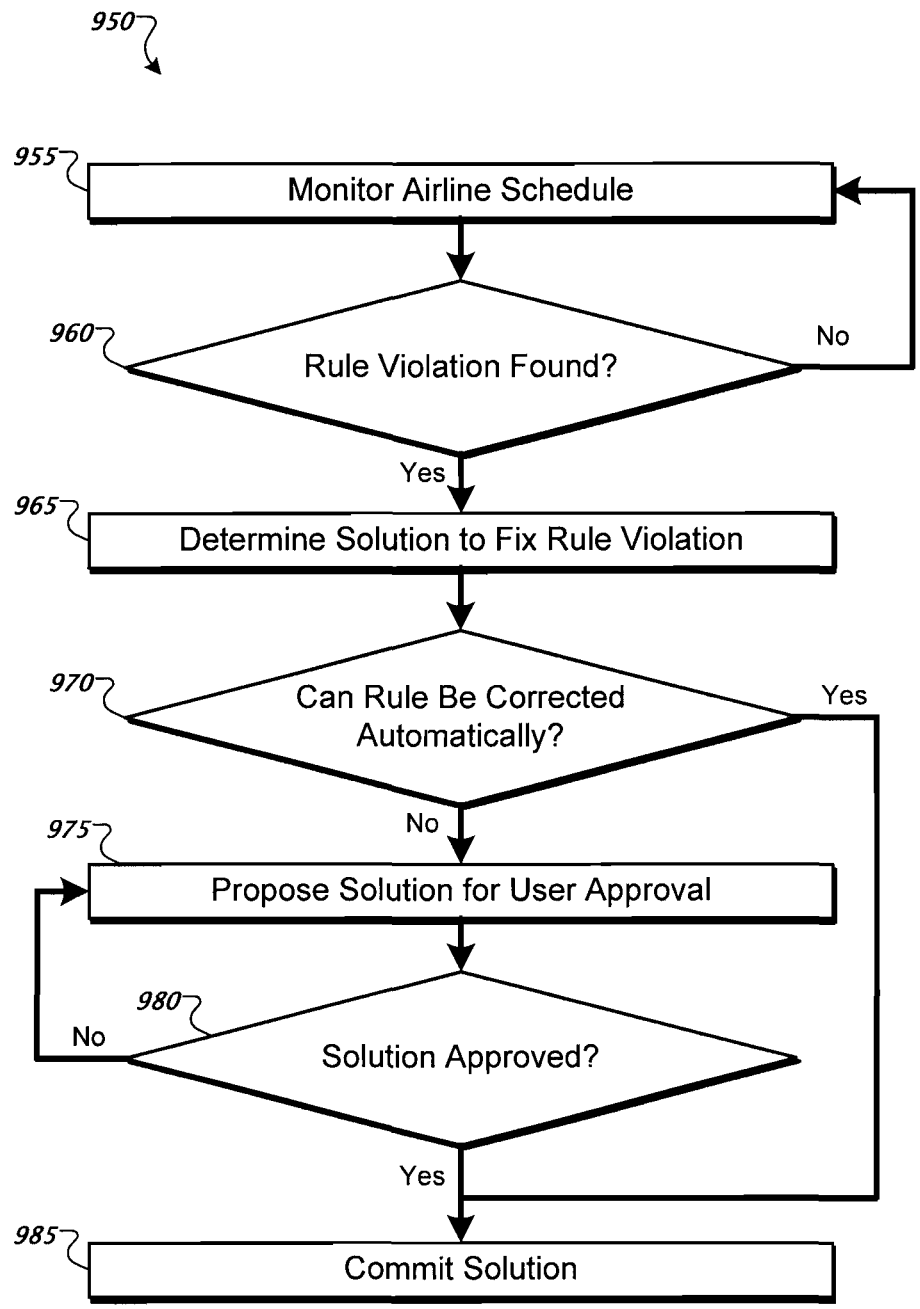
FIG. 9C is a flow chart of a method of monitoring rules violations using the system of FIGS. 9A and 9B.

As shown in FIG. 9C, a paradigm offered by some implementations of the airline operations computing system described in this document is a tracking system with embedded solver technology where the solver is transparent to the users. The system will be able to simply confirm the proffered solution, or potentially, allow the system to automatically correct certain types of problems. The system may be able to provide such functionality without requiring any intervention by the user. The user will be able to monitor and be able to review the action of the system, but are not tightly coupled into the decision process.

An example method 950 of providing such functionality in an airline operations computing system is shown in FIG. 9C. In step 955, airline operations are monitored in background processing functions without intervention or initiation by a user, and in the event of a rule violation at step 960, processing proceeds to step 965 in which a solution is determined to fix the rule violation. Processing then proceeds to step 970 in which there is a determination of whether the rule can be corrected automatically.

If the rule is not one that is preconfigured to be one that cannot be corrected automatically, then at step 975 a determined solution is proposed for user approval. If at step 980, user approval is provided, then processing proceeds to step 985 where the solution (that is, change to the schedule) is committed. If the user indicates disapproval, then processing proceeds back to step 975 where the system (solver) determines another solution and proposes that to the user.

If at step 970 on the other hand the rule being violated is one that is preconfigured to be automatically correctable, then processing proceeds directly to step 985 where the solution (change in schedule) is committed). In this situation, a user need not be in the process of solving the rule violation and implementing the solution. Rather, it is fixed automatically.

Figure 10:
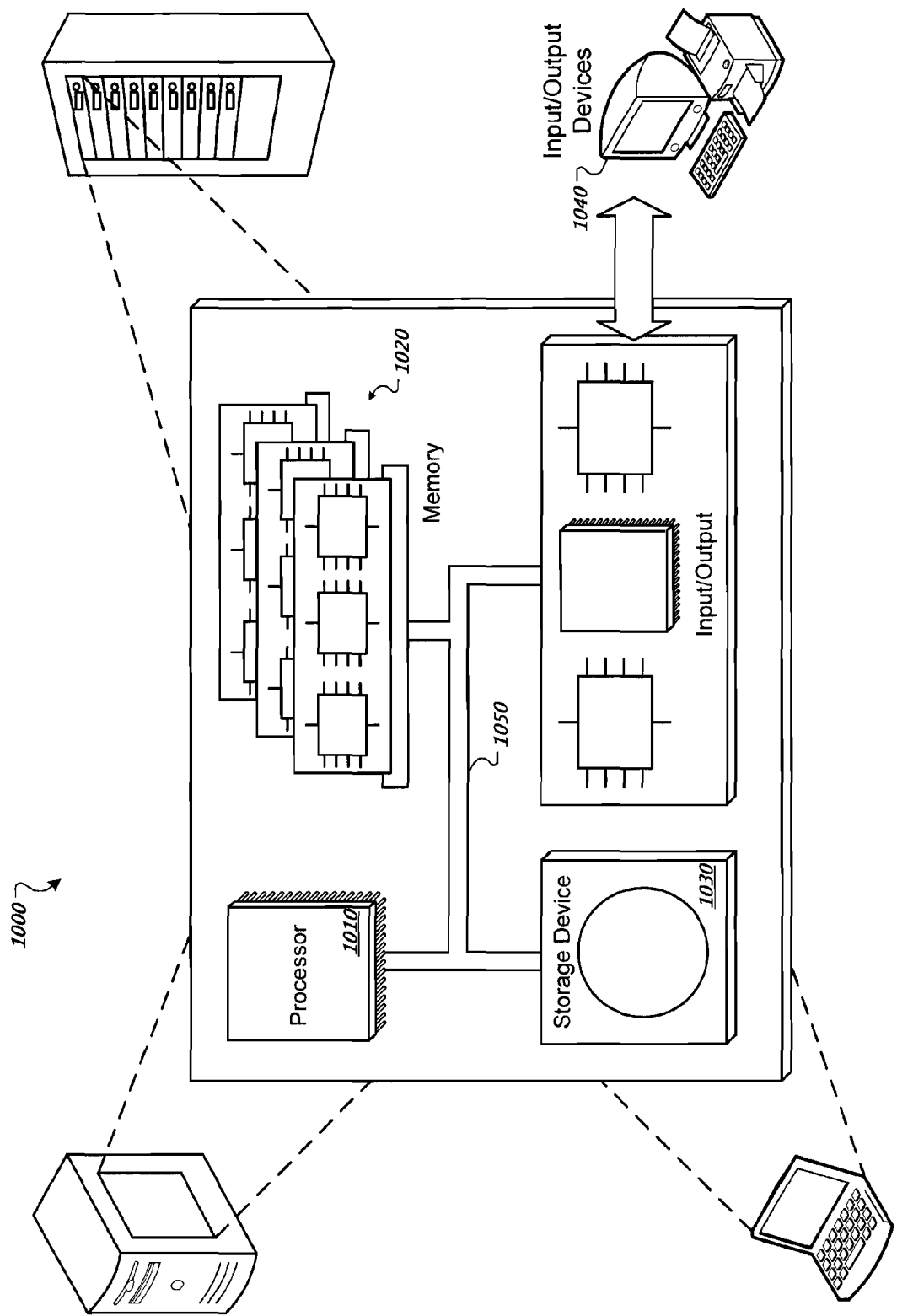
FIG. 10 is a block diagram of a generic computing system on which the various software-based methods may be executed.

FIG. 10 is a schematic of a general computing system 1000. The system 1000 can be used for the operations described in association with any of the computer-implement methods described previously, according to one implementation. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although the embodiments described above have been described in terms of airline operations, embodiments for other purposes are possible. For example, the systems described may be modified to schedule and associate crews and equipment for land transportation (e.g., rail, busses, taxis, limousines, trucks), watercraft (e.g., ships, ferries), aircraft, spacecraft, industrial equipment (e.g., fishing trawlers, oil rigs), construction equipment, mining equipment, military equipment (e.g., tanks, patrol vehicles, reconnaissance vehicles), or other types of operations where a schedule of crews or operators may be associated with a vehicle or other machine. The described systems may also be modified for use in scenarios that do not necessarily include a vehicle. For example, the systems described may be modified for use by a travel agency to schedule and associate tour guides, tourists, tour stops, hotels, restaurants, transportation, or other items that may be associated with a tour package.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method used in accomplishing revisions to a schedule of resources for an airline operation in a system in which multiple different users are permitted to simultaneously access and make changes to the schedule of resources, the method comprising:

receiving, from a first user employing a first user computing device, a first request to access a schedule of resources for an airline operation;

receiving, from a second user employing a second user computing device, a second request to access the schedule of resources for the airline operation;

providing to the first and second user computing devices simultaneous access to the schedule of resources;

receiving, from the first user employing the first user computing device, a proposed change to the schedule of resources for the airline operation through a first graphical display, the proposed change impacting one or more flight-resource pairings of the schedule of resources; and before the proposed change is committed and an update to the schedule of resources is made to include the proposed change received from the first user through the first graphical display, providing, on the second user computing device being employed by the second user to simultaneously access the schedule of resources and make changes to the schedule of resources, a second graphical display of at least a portion of the schedule of resources that includes at least one of the one or more flight-resource pairings impacted by the proposed change of the first user, the second graphical display providing a visual indication identifying the one or more flight-resource pairings impacted by the proposed change of the first user as pairings that are being edited elsewhere by another user.

2. The method of claim 1, wherein each flight-resource pairing of the schedule of resources comprises one or more flights in a series of flights and an associated crew member.

3. The method of claim 1, wherein the second user, during a time in which the proposed change of the first user is pending, is not locked from proposing a second change that impacts the one or more flight-resource pairings impacted by the proposed change of the first user.

4. The method of claim 1, further comprising receiving, from the second user employing the second user computing device and during the time in which the proposed change of the first user is pending, the second proposed change that impacts the one or more flight-resource pairings impacted by the proposed change of the first user.

5. The method of claim 4, further comprising receiving user input committing the proposed change, and in response, updating the schedule of resources for the airline operation to include the proposed change.

6. The method of claim 1, wherein at least one of the one or more flight-resource pairings does not have an assigned resource.

7. The method of claim 6, wherein the proposed change proposed an assignment of a resource to the flight-resource pairing not yet having a resource assignment.

8. The method of claim 1, wherein all of the one or more flight-resource pairings have an assigned resource and the proposed change proposes a change to one of the one or more flight-resource pairings.

9. A computer program product tangibly embodied in computer storage medium and comprising instructions that when executed by a processor cause the following operations to be performed to accomplishing revisions to a schedule of resources for an airline operation in a system in which multiple different users are permitted to simultaneously access and make changes to the schedule of resources:

receive, from a first user employing a first user computing device, a first request to access a schedule of resources for an airline operation;

receive, from a second user employing a second user computing device, a second request to access the schedule of resources for the airline operation;

provide, to the first and second user computing devices, simultaneous access to the schedule of resources;

receive, from the first user employing the first user computing device, a proposed change to the schedule of resources for the airline operation through a first graphical display, the proposed change impacting one or more flight-resource pairings of the schedule of resources; and before the proposed change is committed and an update to the schedule of resources is made to include the proposed change received from the first user through the first graphical display, provide, on the second user computing device being employed by the second user to simultaneously access the schedule of resources and make changes to the schedule of resources, a second graphical display of at least a portion of the schedule of resources that includes at least one of the one or more flight-resource pairings impacted by the proposed change of the first user, the second graphical display providing a visual indication identifying the one or more flight-resource pairings impacted by the proposed change of the first user as pairings that are being edited elsewhere by another user.

10. The computer program product of claim 9, wherein each flight-resource pairing of the schedule of resources comprises one or more flights in a series of flights and an associated crew member.

11. The computer program product of claim 9, wherein the second user, during a time in which the proposed change of the first user is pending, is not locked from proposing a second change that impacts the one or more flight-resource pairings impacted by the proposed change of the first user.

12. The computer program product of claim 9, wherein the operations further comprise receiving, from the second user employing the second user computing device and during the time in which the proposed change of the first user is pending, the second proposed change that impacts the one or more flight-resource pairings impacted by the proposed change of the first user.

13. The computer program product of claim 12, wherein the operations further comprise receiving user input committing the proposed change, and in response, updating the schedule of resources for the airline operation to include the proposed change.

14. The computer program product of claim 9, wherein at least one of the one or more flight-resource pairings does not have an assigned resource.

15. The computer program product of claim 14, wherein the proposed change proposed an assignment of a resource to the flight-resource pairing not yet having a resource assignment.

16. The computer program product of claim 9, wherein all of the one or more flight-resource pairings have an assigned resource and the proposed change proposes a change to one of the one or more flight-resource pairings.

17. A system comprising:

one or more computers; and a non-transitory computer-readable storage medium coupled to the one or more computers having instructions stored thereon which, when executed by the one or more computers, cause the one or more computers to perform operations comprising:

receiving, from a first user employing a first user computing device, a first request to access a schedule of resources for an airline operation;

receiving, from a second user employing a second user computing device, a second request to access the schedule of resources for the airline operation;

providing, to the first and second user computing devices, simultaneous access to the schedule of resources;

receiving, from the first user employing the first user computing device, a proposed change to the schedule of resources for the airline operation through a first graphical display, the proposed change impacting one or more flight-resource pairings of the schedule of resources, and before the proposed change is committed and an update to the schedule of resources is made to include the proposed change received from the first user through the first graphical display, providing, on the second user computing device being employed by the second user to simultaneously access the schedule of resources and make changes to the schedule of resources, a second graphical display of at least a portion of the schedule of resources that includes at least one of the one or more flight-resource pairings impacted by the proposed change of the first user, the second graphical display providing a visual indication identifying the one or more flight-resource pairings impacted by the proposed change of the first user as pairings that are being edited elsewhere by another user.

18. The system of claim 17, wherein the visual indication includes text that indicates an identity of the first user.

19. The method of claim 1, wherein the visual indication includes text that indicates an identity of the first user.

20. The product of claim 9, wherein the visual indication includes text that indicates an identity of the first user.

* * * * *